US 9,737,929 B2

(12) United States Patent
Morais et al.

(10) Patent No.: US 9,737,929 B2
(45) Date of Patent: Aug. 22, 2017

(54) BRAKE CALIPER FOR DISC BRAKE ASSEMBLY AND METHOD AND APPARATUS FOR PRODUCING SAME

(71) Applicant: Kelsey-Hayes Company, Livonia, MI (US)

(72) Inventors: Antonio Eduardo Morais, South Lyon, MI (US); Harry D. Miller, Canton, MI (US); Anthony Schmandt, Walled Lake, MI (US); Sky Lintner, Ypsilanti, MI (US)

(73) Assignee: Kelsey-Hayes Company, Livonia, MI (US)

( * ) Notice: Subject to any disclaimer, the term of this patent is extended or adjusted under 35 U.S.C. 154(b) by 71 days.

(21) Appl. No.: 14/560,603

(22) Filed: Dec. 4, 2014

(65) Prior Publication Data

US 2016/0158830 A1 Jun. 9, 2016

(51) Int. Cl.
| | | |
|---|---|---|
| *B22C 9/10* | (2006.01) | |
| *B22C 9/22* | (2006.01) | |
| *B22D 25/02* | (2006.01) | |
| *B22D 29/00* | (2006.01) | |
| *F16D 65/00* | (2006.01) | |
| *B22D 23/02* | (2006.01) | |

(52) U.S. Cl.
CPC ............... *B22C 9/10* (2013.01); *B22C 9/108* (2013.01); *B22C 9/22* (2013.01); *B22D 23/02* (2013.01); *B22D 25/02* (2013.01); *F16D 65/0068* (2013.01); *F16D 2250/0015* (2013.01)

(58) Field of Classification Search
CPC .. B22C 9/10; B22C 9/108; B22C 9/22; B22D 23/02; B22D 25/02

USPC ................ 164/69.1, 132, 137, 340, 369
See application file for complete search history.

(56) References Cited

U.S. PATENT DOCUMENTS

| | | |
|---|---|---|
| 2008/0217117 A1 | 9/2008 | Severinsson et al. |
| 2011/0192686 A1 | 8/2011 | Morais et al. |

FOREIGN PATENT DOCUMENTS

| | | |
|---|---|---|
| JP | 2002333041 A | 11/2002 |
| JP | 2008309181 A | 12/2008 |
| JP | 2009030802 A | 2/2009 |

OTHER PUBLICATIONS

PCT International Search Report and Written Opinion, Application No. PCT/US2015/063624, dated Feb. 19, 2016.

*Primary Examiner* — Kevin P Kerns
(74) *Attorney, Agent, or Firm* — MacMillan, Sobanski & Todd, LLC

(57) ABSTRACT

A brake caliper adapted for use in a vehicle disc brake assembly and method and apparatus for producing the same. The apparatus for producing the brake caliper comprises a mold member and a core member. The mold member has two mold sections meeting at a vertical interface, the first mold section having an extension from the vertical interface into the second mold section to form an integrally cast lug on the brake caliper. The core member has three extensions operative to form three integrally cast locating surfaces on the cast brake caliper, the extensions defining datum surfaces for subsequent machining of the cast brake caliper to predetermined tolerances using the three locating surfaces as the datum surfaces.

7 Claims, 37 Drawing Sheets

BRAKE CALIPER FOR DISC BRAKE ASSEMBLY AND METHOD AND APPARATUS FOR PRODUCING SAME

BACKGROUND OF INVENTION

This invention relates in general to vehicle disc brake assemblies and in particular to a brake caliper adapted for use in such a vehicle disc brake assembly and method and apparatus for producing the brake caliper.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefore, are well known in the art.

A typical disc brake assembly includes a rotor which is secured to the wheel of the vehicle for rotation therewith. The rotor includes a pair of opposed friction plates which are selectively engaged by portions of a caliper assembly. The caliper assembly is slidably supported by pins secured to an anchor plate. The anchor plate is secured to a non-rotatable component of the vehicle, such as the vehicle frame. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

SUMMARY OF INVENTION

This invention relates to a brake caliper adapted for use in a vehicle disc brake assembly and method and apparatus for producing the same.

According to one embodiment, an apparatus for producing one or more brake calipers for use in a vehicle disc brake assembly may comprise, individually and/or in combination, one or more of the following features: a mold for producing one or more brake calipers adapted for use in a disc brake assembly comprising a first mold section, a second mold section, and a core member. The first mold section has a first vertical face and a receptacle extending inwardly from the first vertical face to an interior back surface of the first mold section. The second mold section has a second vertical face and an outward extension from the second vertical face to a tip, wherein the tip is a horizontal distance from the second vertical face, the tip enters the receptacle when the first face contacts the second face, and the extension and receptacle are operative to form an integrally cast lug on a brake caliper. The core member has three extensions operative to form three integrally cast locating surfaces on the brake caliper, the extensions defining datum surfaces for subsequent machining of the brake caliper to predetermined tolerances using the three locating surfaces as the datum surfaces, wherein the core member is disposable between the first and second mold sections during a casting process which is configured to produce the brake caliper.

According to another embodiment, a method for producing one or more brake calipers for use in a vehicle brake assembly may comprise, individually and/or in combination, one or more of the following features: providing a mold member having two mold sections meeting at a vertical interface, the first mold section having an extension from the vertical interface into the second mold section for a horizontal distance to form an integrally cast lug on a cast brake caliper and a core member having three extensions operative to form three integrally cast locating surfaces on the cast brake caliper, the extensions defining datum surfaces for subsequent machining of the cast brake caliper to predetermined tolerances using the three locating surfaces as the datum surfaces. The core member is disposed in the mold member. A suitable casting material is supplied to the mold member so as to form the brake caliper within the mold. The cast brake caliper is removed from the mold member, wherein the brake caliper includes the three integrally cast locating surfaces formed therein by the three extensions of the core member and the integrally cast lug formed by the extension. The cast brake caliper is machined using the three integrally cast locating surfaces formed on the brake caliper as the datum surfaces to thereby produce the brake caliper.

According to another embodiment, a cast brake caliper for use in a disc brake assembly may comprise, individually and/or in combination, one or more of the following features: a brake caliper having inboard and outboard leg portions, an intermediate bridge portion, and at least one piston bore. The inboard leg portion has a pair of locating surfaces and the outboard leg portion has a single locating surface, wherein the locating surfaces are integrally formed by a core member of a casting apparatus during casting of the brake caliper. The intermediate bridge portion interconnects the inboard and outboard leg portions. The at least one piston bore is formed in the intermediate bridge portion, the at least one piston bore having a lug cast in an external surface of the piston bore, wherein the lug is integrally formed during casting of the brake caliper by an extension of a first mold section of the casting apparatus for a horizontal distance into a corresponding receptacle of a second mold section of the casting apparatus.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
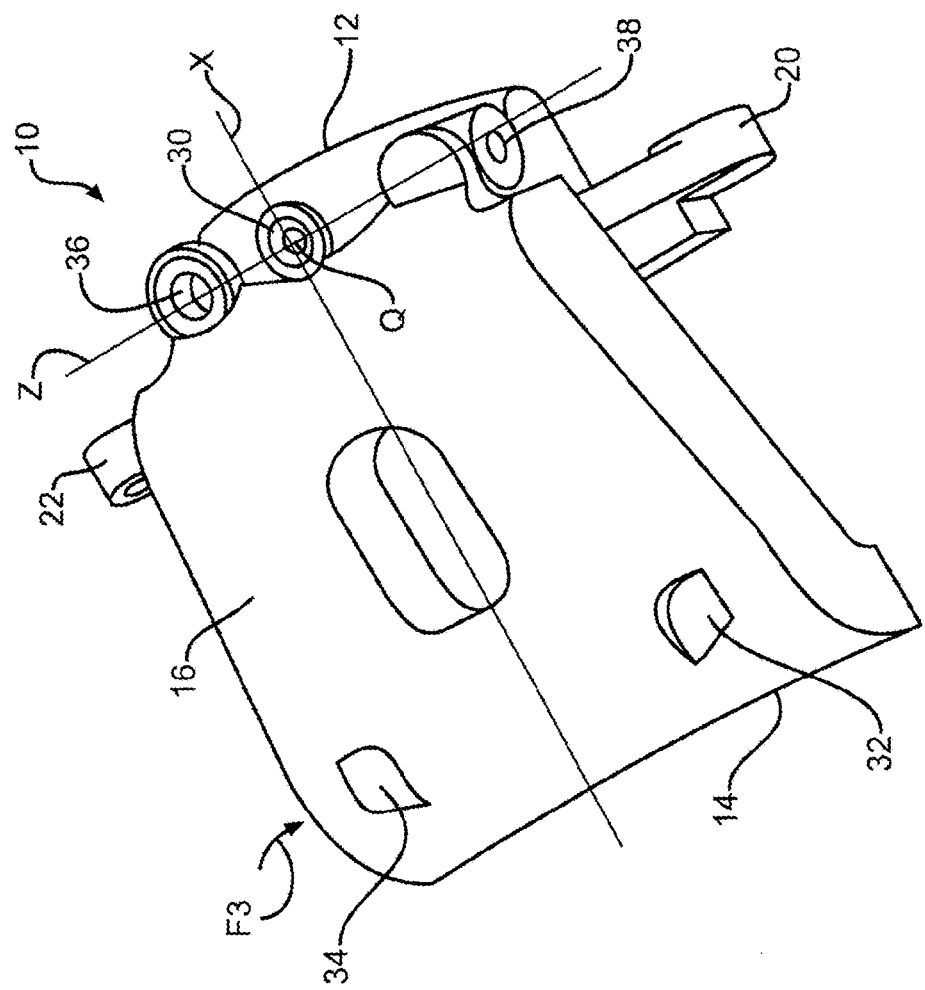
FIG. 1 is a perspective view of a first embodiment of a first prior art brake caliper.

Referring now to the drawings, there is illustrated in FIGS. 1-4a first embodiment of a first prior art brake caliper, indicated generally at 10, adapted for use in a vehicle disc brake assembly. It should be noted that while this invention will be described and illustrated in conjunction with the particular prior art brake caliper structures disclosed herein, it will be appreciated that this invention may be used in conjunction with other brake caliper structures adapted for use in other kinds of vehicle disc brake assemblies.

Figure 4:
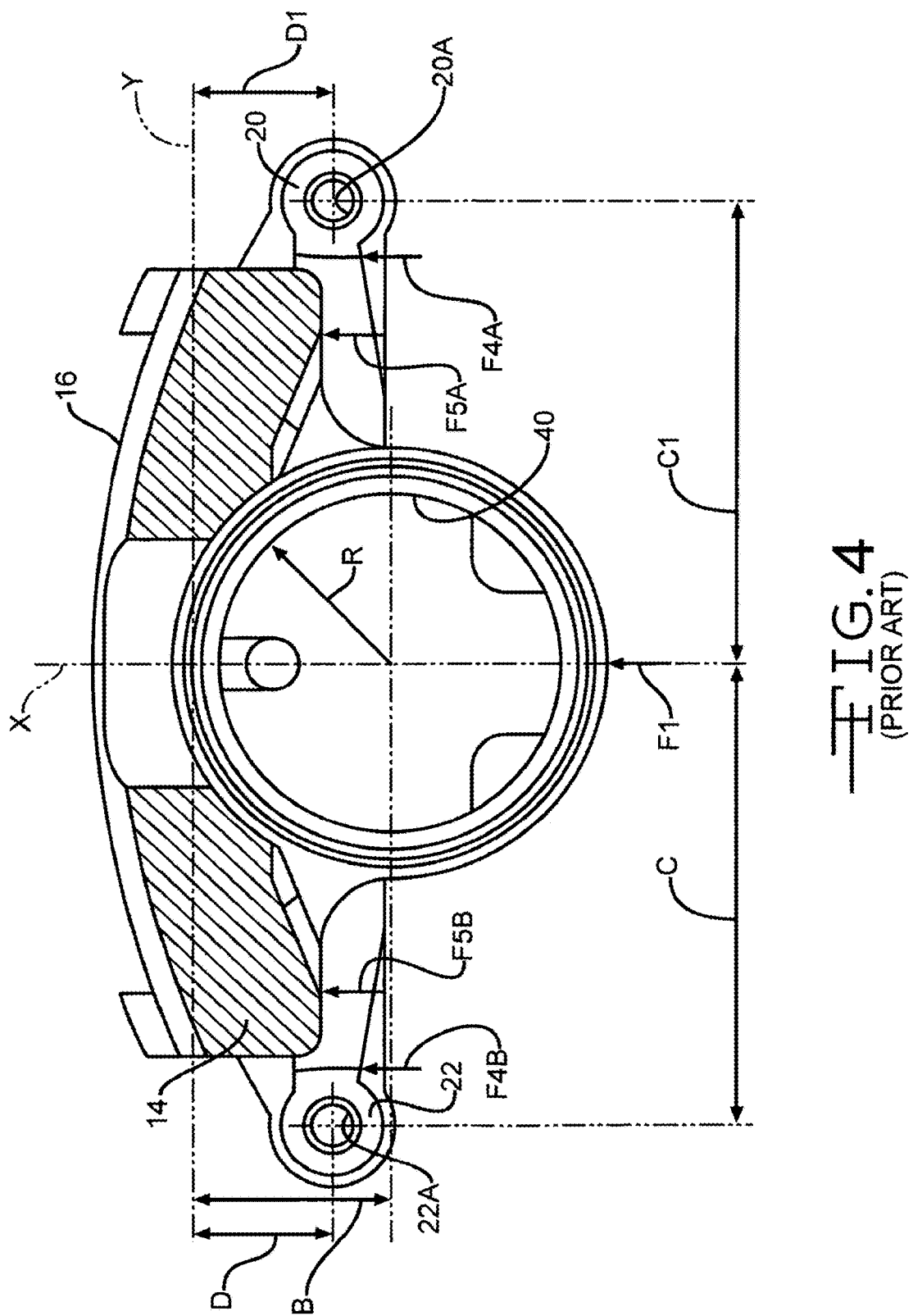
FIG. 4 is an inboard facing side view of the first embodiment of the first prior art brake caliper illustrated in prior art FIGS. 1-3.

The illustrated brake caliper 10 is adapted for use in a "Colette" type of disc brake assembly, such as that shown in U.S. Pat. No. 5,323,882 to Waterman et al. and U.S. Pat. No. Re 30,255 to Rath et al., the disclosures of both of these patents are herein incorporated by reference. The prior art brake caliper 10 is a generally C-shaped single-pot brake caliper and includes an inboard leg portion 12 and an outboard leg portion 14 which are interconnected by an intermediate bridge portion 16. The inboard leg 12 of the prior art brake caliper 10 includes a pair of ears 20 and 22. As best shown in FIG. 4, the ear 20 includes an opening 20A formed therethrough, and the ear 22 includes an opening 22A formed therethrough. In the illustrated embodiment, the openings 20A and 22A are non-threaded or through holes and are adapted to receive a portion of a slide pin bolt (not shown) for supporting the brake caliper 10 for sliding movement during actuation thereof in a known manner. The prior art brake caliper 10 is formed from any suitable castable material, such as for example, iron, aluminum, and alloys thereof.

Figure 2:
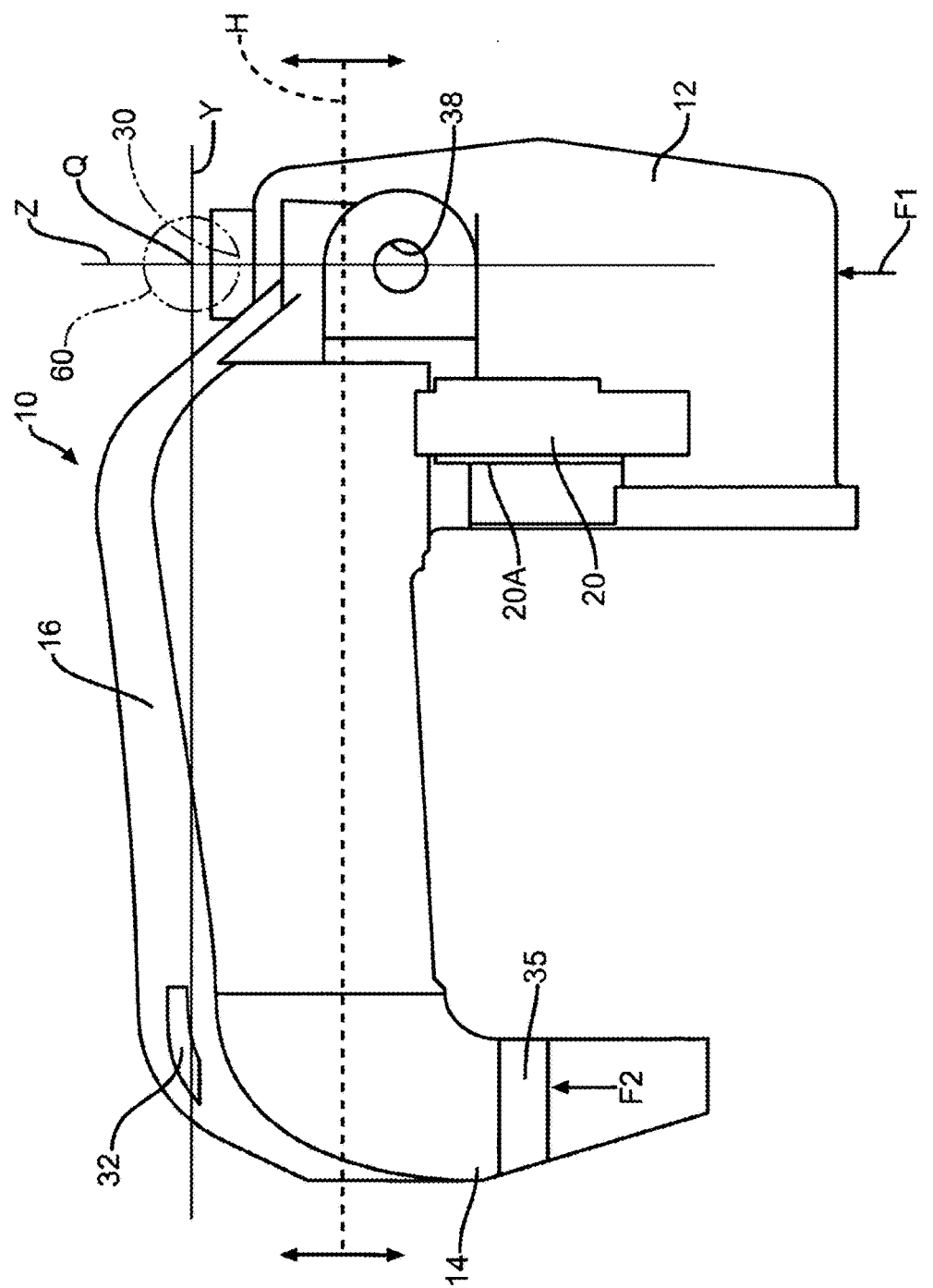
FIG. 2 is a side view of the first embodiment of the first prior art brake caliper illustrated in prior art FIG. 1.
Figure 3:
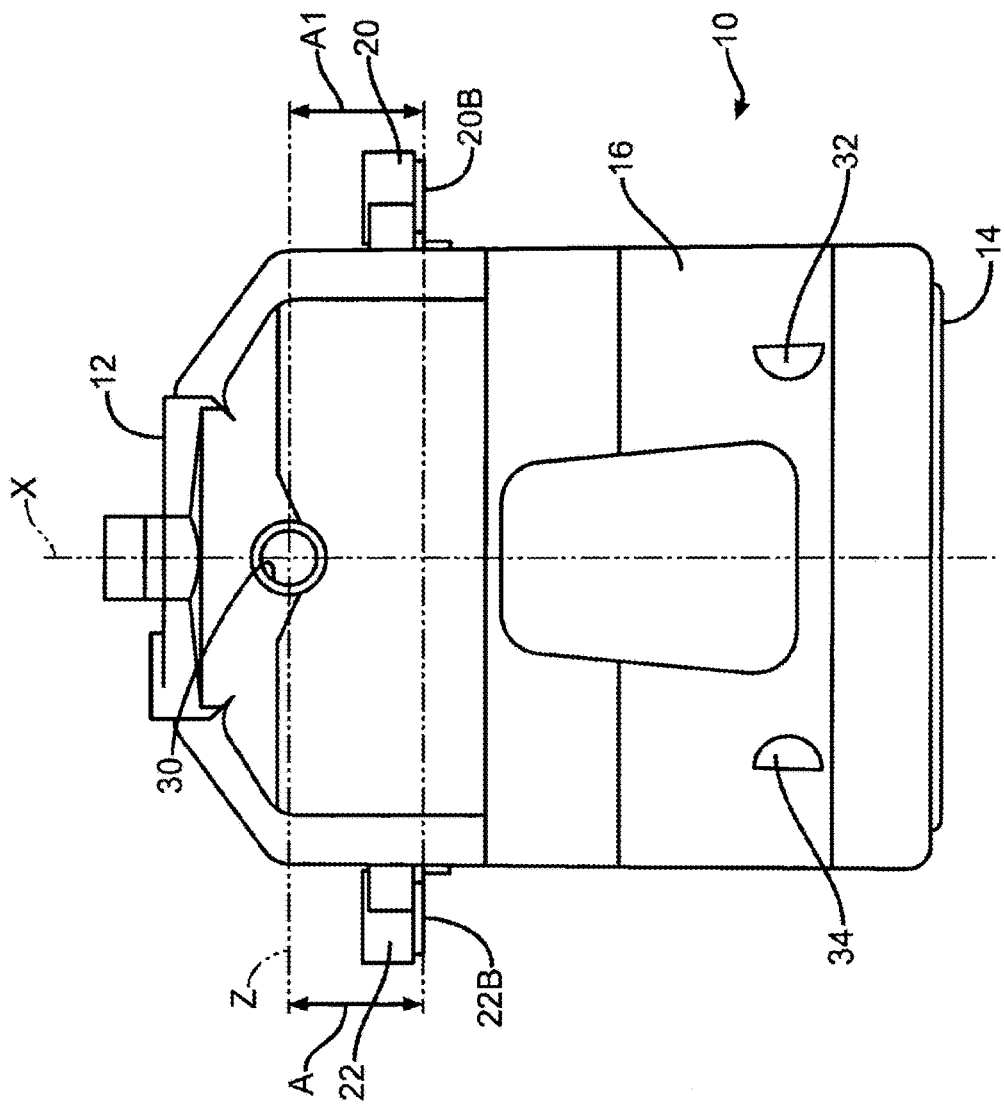
FIG. 3 is a top view of the first embodiment of the first prior art brake caliper illustrated in prior art FIGS. 1 and 2.

The prior art brake caliper 10 further includes a recess 30 and a pair of first surfaces 32 and 34 and a pair of second surfaces (only one of the second pair of surfaces is best shown at 35 in prior art FIG. 2), for a purpose to be discussed below. Preferably, the recess 30 is a generally conical-shaped closed recess, the surfaces 32 and 34 are generally flat surfaces, and the surfaces 35 are generally flat angled surfaces as shown in FIG. 2. Also, the recess 30 and the surfaces 32, 34, and 35 are preferably as-cast surfaces accurately formed during the casting process to predetermined tolerances, although slight cleaning or brushing of one or more of the recess 30 and the surfaces 32, 34, and 35 may occur subsequent to the casting process. The prior art brake caliper 10 further includes a fluid supply inlet port 36, a bleed port 38, and a piston bore 40. Alternatively, the structure of the prior art brake caliper 10 can be other than illustrated if so desired.

Figure 5:
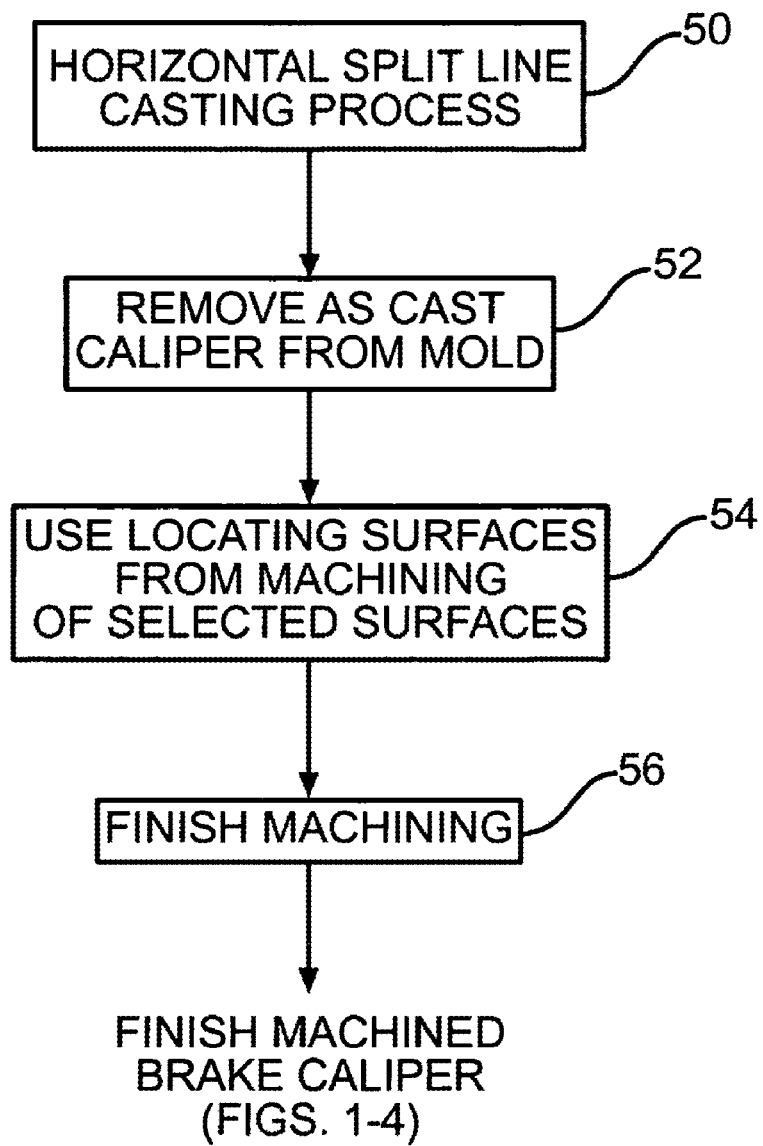
FIG. 5 is a block diagram showing a sequence of steps for producing either the first embodiment of the first prior art brake caliper illustrated in prior art FIGS. 1-4 and/or a second embodiment of a first prior art brake caliper illustrated in prior art FIGS. 6-12.
Figure 6:
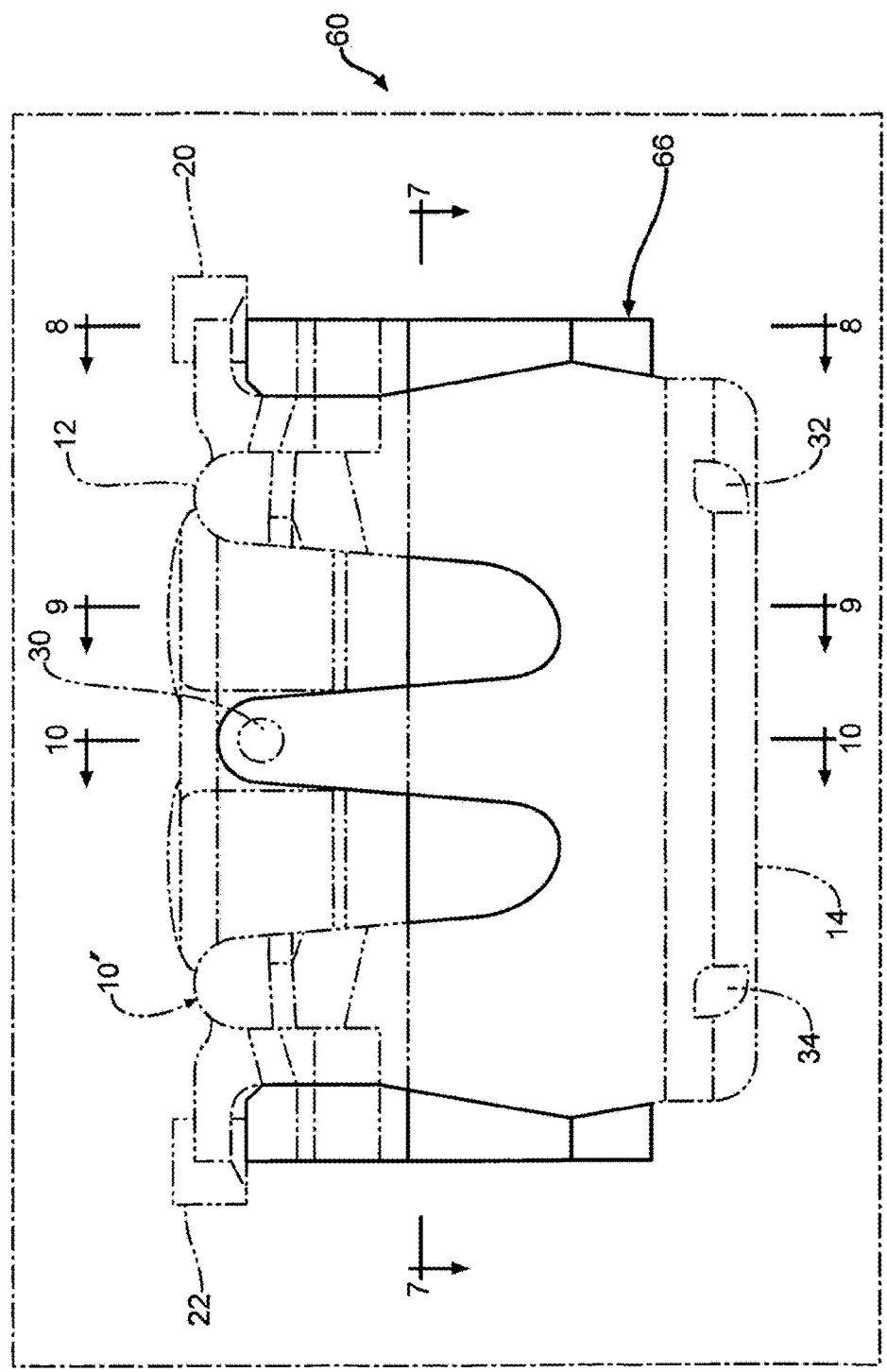
FIG. 6. is a top view of a portion of a first prior art casting apparatus adapted for use in producing the first prior art brake calipers, the casting for the second embodiment of the first prior art brake caliper being illustrated.
Figure 7:
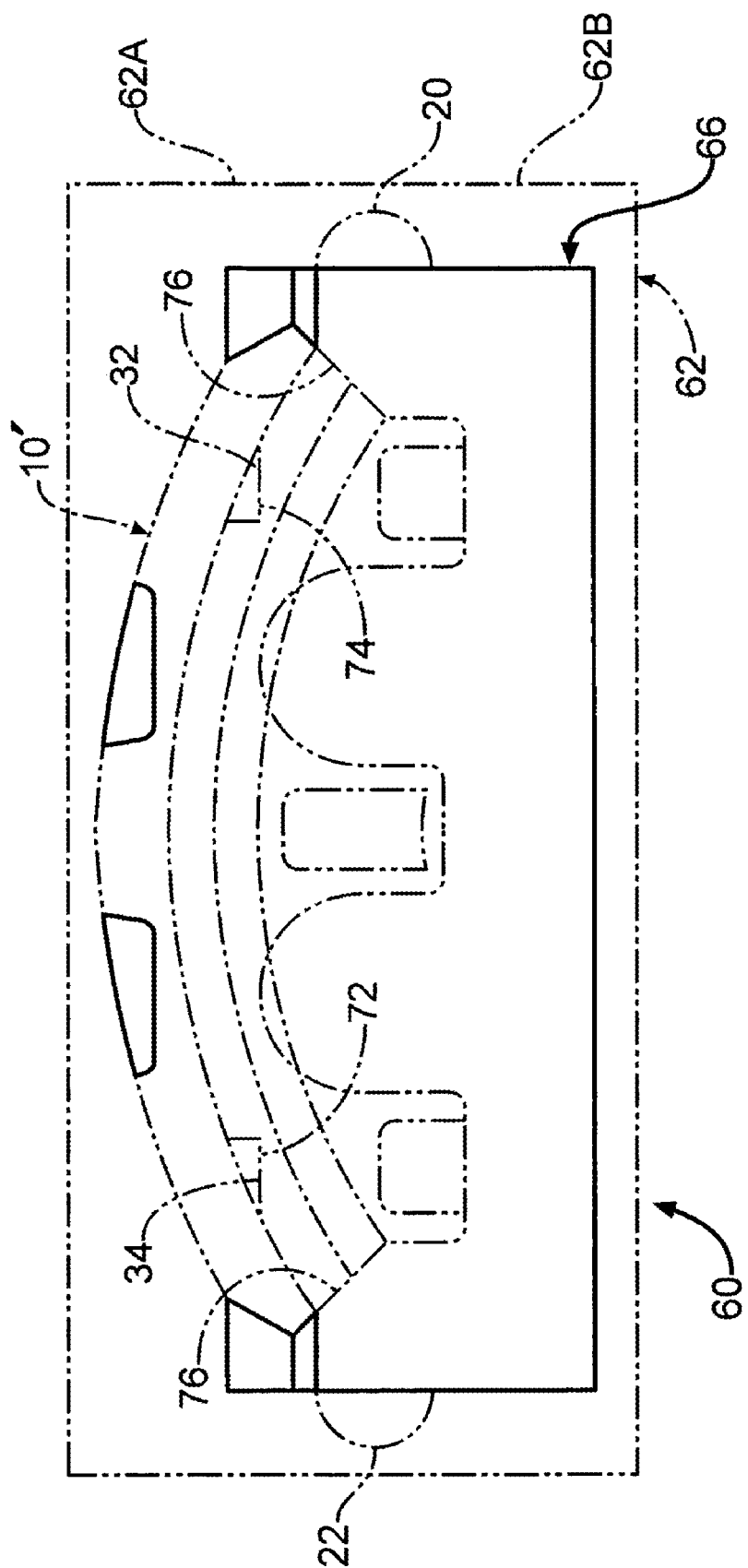
FIG. 7 is a sectional view taken along line 7-7 of prior art FIG. 6.
Figure 8:
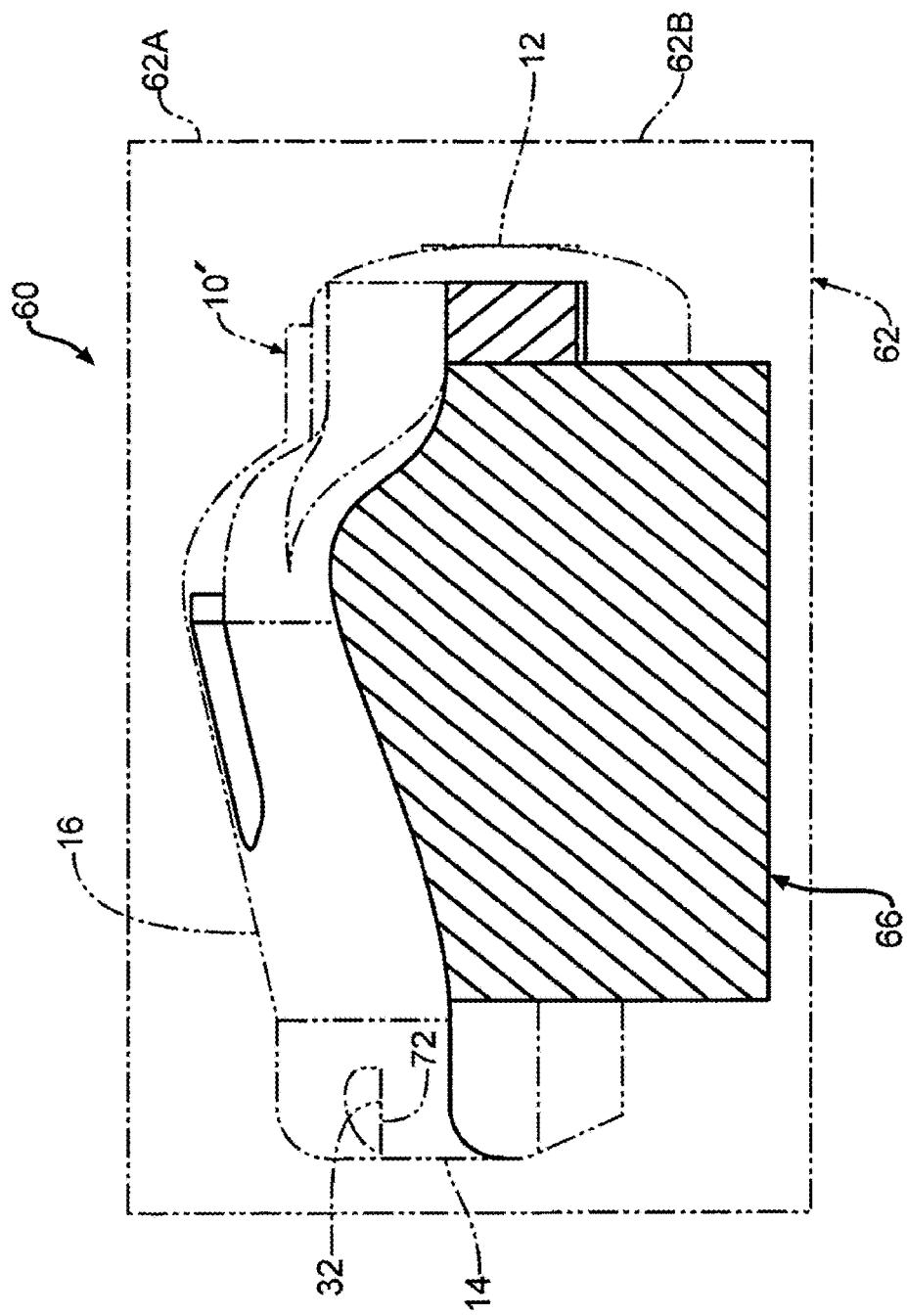
FIG. 8 is a sectional view taken along line 8-8 of prior art FIG. 6.
Figure 9:
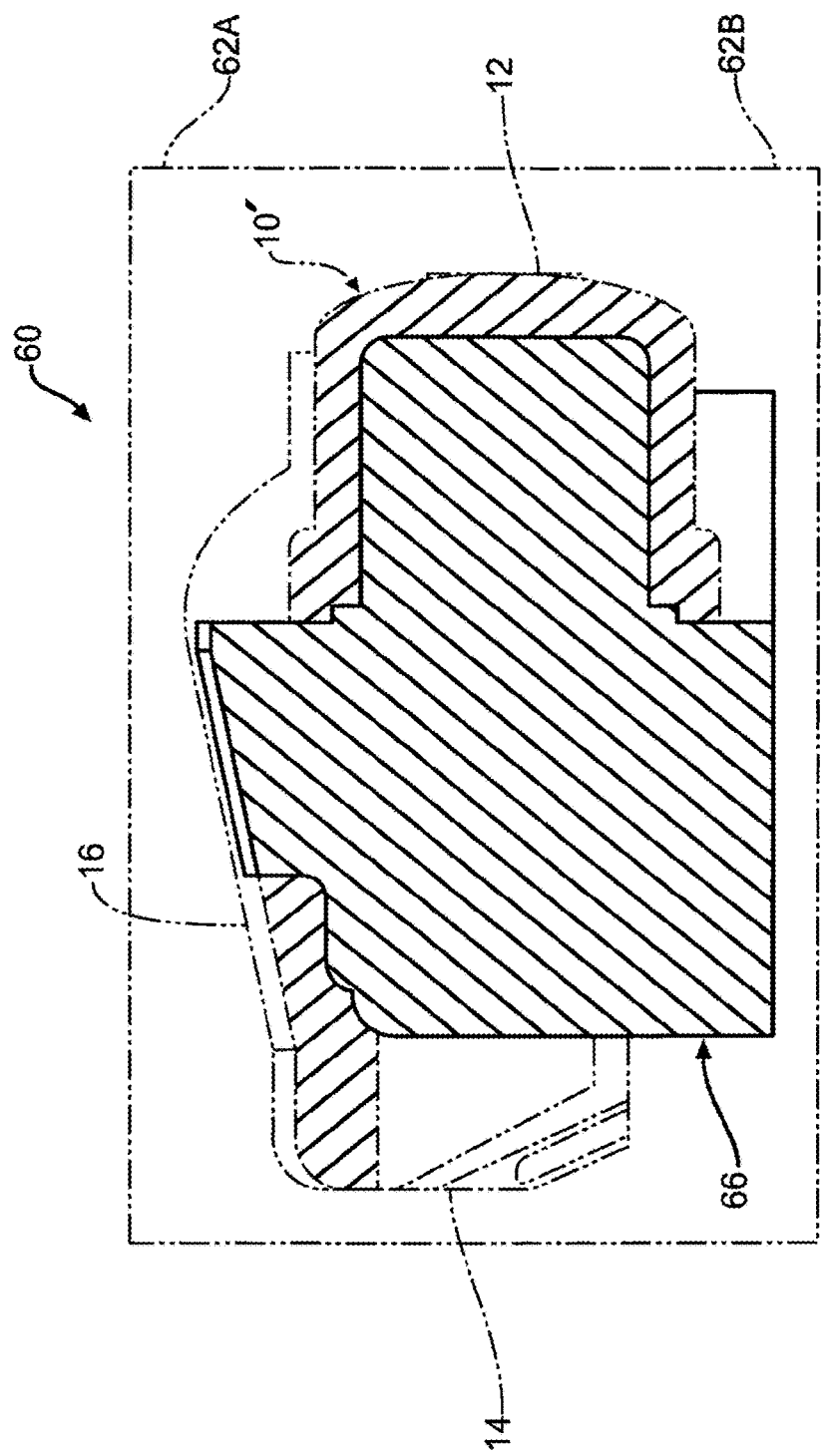
FIG. 9 is a sectional view taken along line 9-9 of prior art FIG. 6.

Referring now to prior art FIG. 5 and using the same reference characters to refer to corresponding parts, there is illustrated a block diagram showing a sequence of steps for producing a second embodiment of the first prior art brake caliper, indicated generally at 10' in prior art FIGS. 6-12, as being a prior art twin-pot piston brake caliper and shown in phantom or broken lines. The second embodiment of the first prior art brake caliper 10' is generally similar to the first embodiment of the first prior art brake caliper 10 except that the caliper 10' is a twin-pot caliper whereas the caliper 10 is a single-pot caliper. Thus, it is understood that the following process described below which is used to produce the prior art twin-pot brake caliper 10' also applies to the prior art single-pot brake caliper 10.

As shown therein, the prior art brake caliper 10' is produced in a casting apparatus, indicated generally at 60 in prior art FIGS. 6-12, during a known horizontal split line casting process during step 50. As used herein, the term horizontal split line casting process means that the prior art brake caliper 10' is produced using typically a mold 62 having two mold or pattern sections 62A and 62B which are disposed with respect to one another so as to produce a horizontal split line H, as shown in prior art FIGS. 2 and 6-12. In the illustrated embodiment, the mold section 62A defines an upper mold section and the mold section 62B defines a lower mold section.

As shown in prior art FIGS. 6-12, the casting apparatus 60 includes a core member, indicated generally at 66 and shown in solid lines, disposed in the mold 62 in a predetermined position. The core member 66 is made of a suitable known material, such as for example, sand and resin, and the mold 62 is made of a suitable material, such as for example, sand and resin. Thus, it is understood that the core member 66 typically is a consumable or non-reusable member which can be used only one time in the casting process and that the mold 62 is also consumable.

Figure 10:
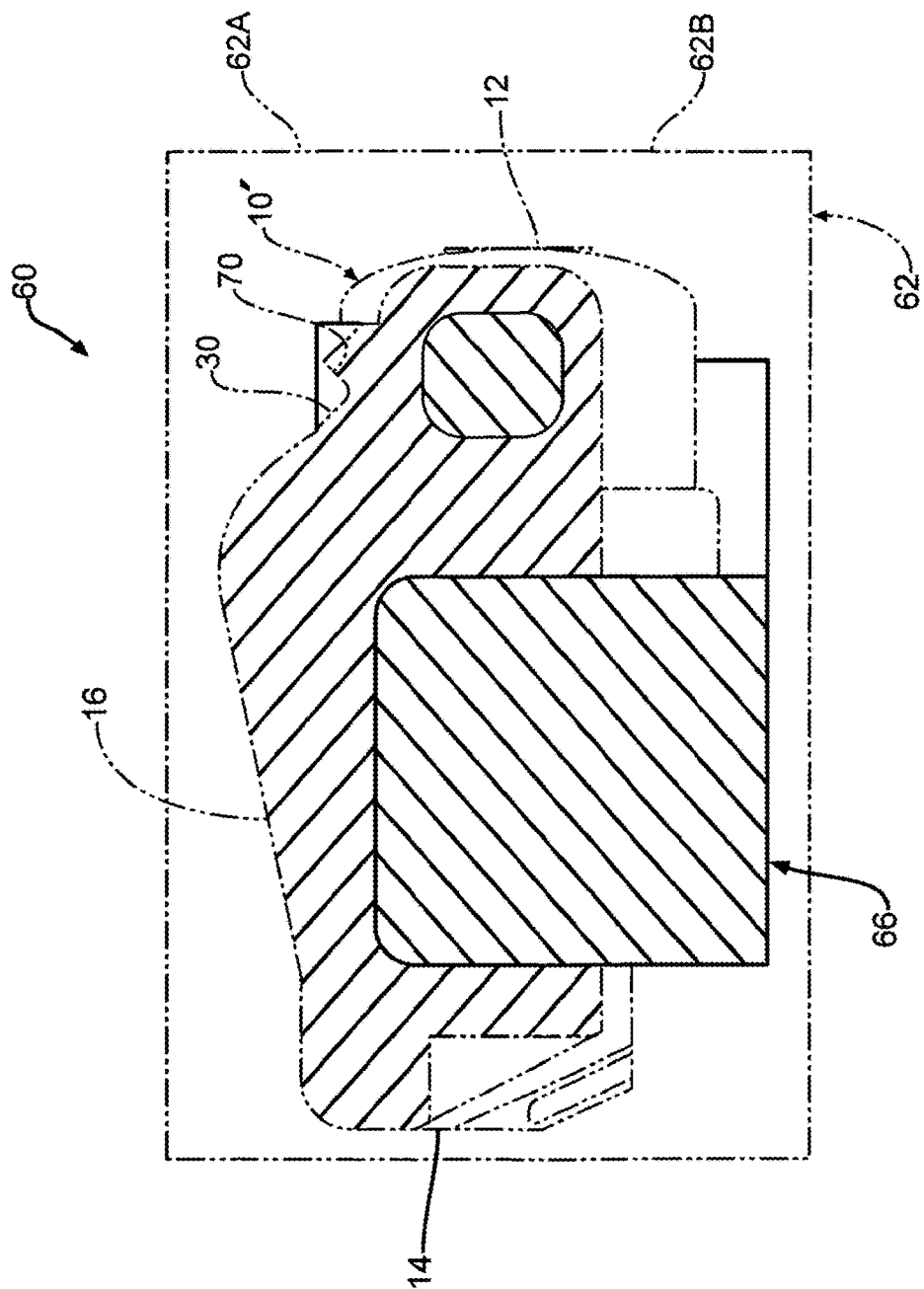
FIG. 10 is a sectional view taken along line 10-10 of prior art FIG. 6.
Figure 11:
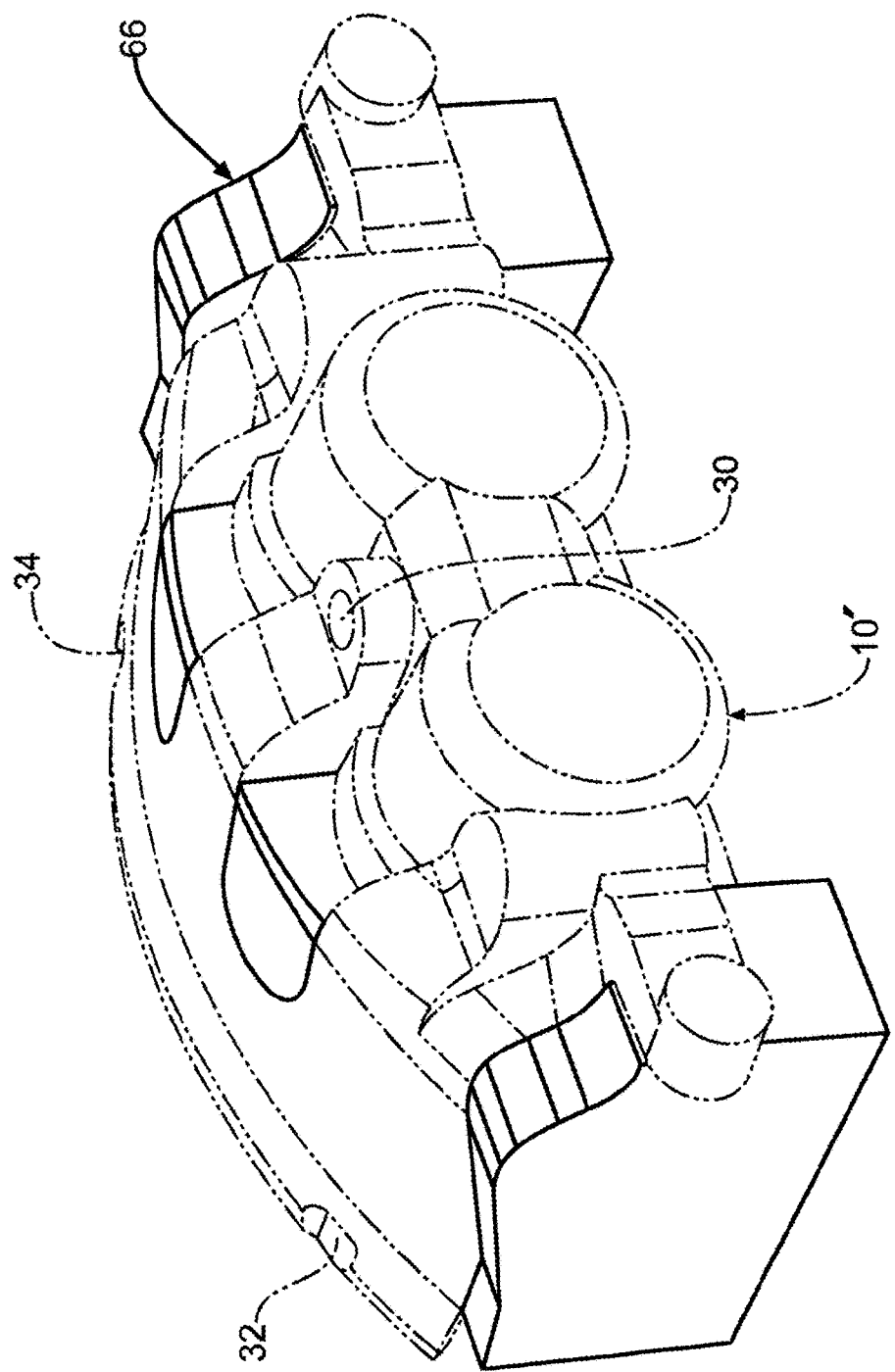
FIG. 11 is a perspective view of the first prior art casting apparatus with the mold portion thereof not shown.
Figure 12:
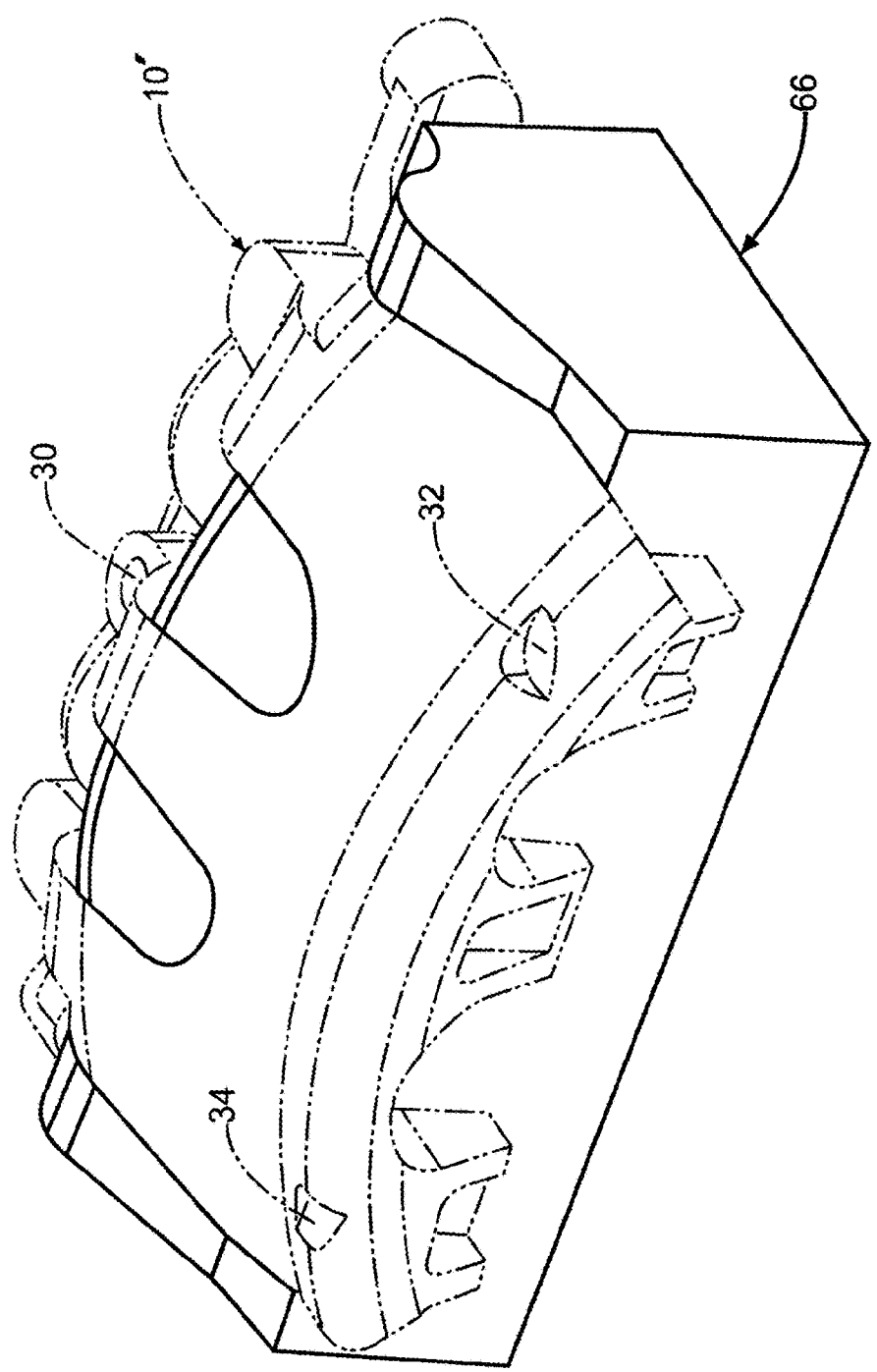
FIG. 12 is another perspective view of the first prior art casting apparatus with the mold portion thereof not being shown.

As best shown in prior art FIG. 10, the upper mold section 62A of the mold 62 includes a first "male" extension or protuberance 70. The first extension 70 has a generally conical shape and is effective to produce the conical recess 30 in the second embodiment of the first prior art cast brake caliper 10'. Also, as best shown in prior art FIG. 7, the upper mold section 62A includes a pair of second male extensions or protuberances 72 and 74. The second extensions 72 and 74 have a generally triangular shaped cross section and are effective to produce the generally flat surfaces 32 and 34, respectively, on the prior art brake caliper 10'. In addition, as best shown in prior art FIG. 7, the lower mold section 62B includes a pair of angled surfaces 76. The surfaces 76 are effective to produce the angled surfaces 35 on the prior art brake caliper 10.

Next, the as-cast prior art brake caliper 10 or 10' is removed from the casting apparatus during step 52. As discussed above, the as-cast prior art brake caliper 10 or 10' includes the conical recess 30 and the flat surfaces 32 and 34.

Following this, selected surfaces of the as-cast prior art brake caliper 10 or 10' are machined to predetermined tolerances using a known machining apparatus (not shown) during step 54. To accomplish this, the conical recess 30 and the surfaces 32 and 34 are used as datum or locating surfaces. In particular, a suitable locating member, such as a predetermined sized ball 60 (shown in phantom in FIG. 2 in conjunction with the prior art brake caliper 10), is disposed in the conical recess 30 and a first clamp member (not shown), which is operative to clamp and apply a first force F1 to a selected surface of the inboard leg portion 12 of the caliper 10 or 10' to hold the ball 60 in the recess 30, and a second clamp member (not shown), which is operative to clamp and apply a second force F2 to a selected surface of the outboard leg 14 of the caliper 10 or 10', are used to define a first vertical plane Z of the as-cast brake caliper 10 or 10'. Next, the ball 60 and the surfaces 32 and 34 are used to define a second horizontal plane Y of the as-cast brake caliper 10 or 10'. Following this, the ball 60 and a third clamp member (not shown), which is operative to clamp and apply a third force F3 on the brake caliper 10 or 10' at a generally opposite location to one of the clamping surfaces 35 provided on a side portion of the outboard leg portion 12, are used to define a third vertical plane X of the as-cast brake caliper 10 or 10'. Alternatively, other suitable methods can be used to hold or clamp the caliper 10 or 10' to enable the surfaces 30, 32, 34, and 35 to be used as locating surfaces to determine the planes X, Y, and Z. For example, forces other than those already described and/or in addition to can be applied to the caliper 10 or 10' at the following locations: forces F4A and F4B can be applied to the caliper ears 20 and 22, respectively, as shown in prior art FIG. 4 and/or forces F5A and F5B can be applied to the outboard leg portion 14 of the caliper 10 or 10', also shown in prior art FIG. 4.

In the illustrated embodiment, the X plane and the Z plane bisect one another in a generally perpendicular manner. And in the illustrated embodiment, the Y plane and the Z plane bisect one another in a generally perpendicular manner. Alternatively, the orientation of one or more of the three planes X, Y, and Z can be other than illustrated if so desired. Also, as shown in prior art FIGS. 1 and 2, a common point Q is defined by the intersection of the three planes X, Y, and Z.

Once the above described three planes X, Y, and Z of the horizontal split line as-cast brake caliper 10 or 10' have been established and with the forces F1, F2, and F3 applied, selected surfaces of the prior art brake caliper 10 or 10' are machined to predetermined tolerances. In the illustrated embodiment, the selected surfaces include the machining of ears 20 and 22 and the machining of a rough cast piston bore 40. In particular, as shown in prior art FIG. 3, an outer surface 22B of the ear 22 is machined a predetermined distance A relative to the Z axis so as to define a flat outer surface which is in parallel relationship with the Z axis. Similarly, an outer surface 20B of the ear 20 is machined a predetermined distance A1 relative to the Z axis so as to define a flat outer surface which is in parallel relationship with the Z axis. In the illustrated embodiment, the distances A and A1 are the same.

Also, as shown in prior art FIG. 4, the opening 22A is machined a predetermined distance C with respect to the X axis and a predetermined distance D with respect to the Y axis. Similarly, the opening 20A is machined a predetermined distance C1 with respect to the X axis and a predetermined distance D1 with respect to the Y axis. In the illustrated embodiment, the distances C and C1 are the same and the distances D and D1 are the same. In addition, as shown in prior art FIG. 4, the piston bore 40 is machined along the X axis a predetermined distance B with respect to the Y axis so as to define a piston bore radius R. Following this, in step 56, other selected surfaces of the prior art brake caliper 10 are machined to predetermined tolerances to produce the finish machined prior art brake caliper 10 or 10'. To accomplish this, one or more of the surfaces 20B and 22B, the apertures 20A and 22A, and the piston bore 40 are used as datum points to carry out the finish machining of the brake caliper 10 or 10' during step 56. The structure and method for producing the prior art brake caliper 10 or 10' thus far described and illustrated is conventional in the art.

Turning now to FIGS. 13-16, there is illustrated a second prior art brake caliper, indicated generally at 100, adapted for use in a vehicle disc brake assembly. The second prior art brake caliper 100 is shown in U.S. Pat. No. 7,168,529 to Morais et al., the disclosure of which is herein incorporated by reference.

The illustrated brake caliper 100 is adapted for use in a "Colette" type of disc brake assembly and is a generally C-shaped twin-pot brake caliper. The brake caliper 100 includes an inboard leg portion 112 and an outboard leg portion 114 which are interconnected by an intermediate bridge portion 116 having an opening 116A formed therein. The inboard leg 112 of the brake caliper 100 includes a pair of ears 120 and 122. Each of the ears 120 and 122 includes an opening 120A and 122A, respectively, formed therethrough. The openings 120A and 122A are adapted to receive a portion of a slide pin bolt (not shown) for supporting the brake caliper 100 for sliding movement during actuation thereof in a known manner. The openings are non-threaded or through holes.

Figure 13:
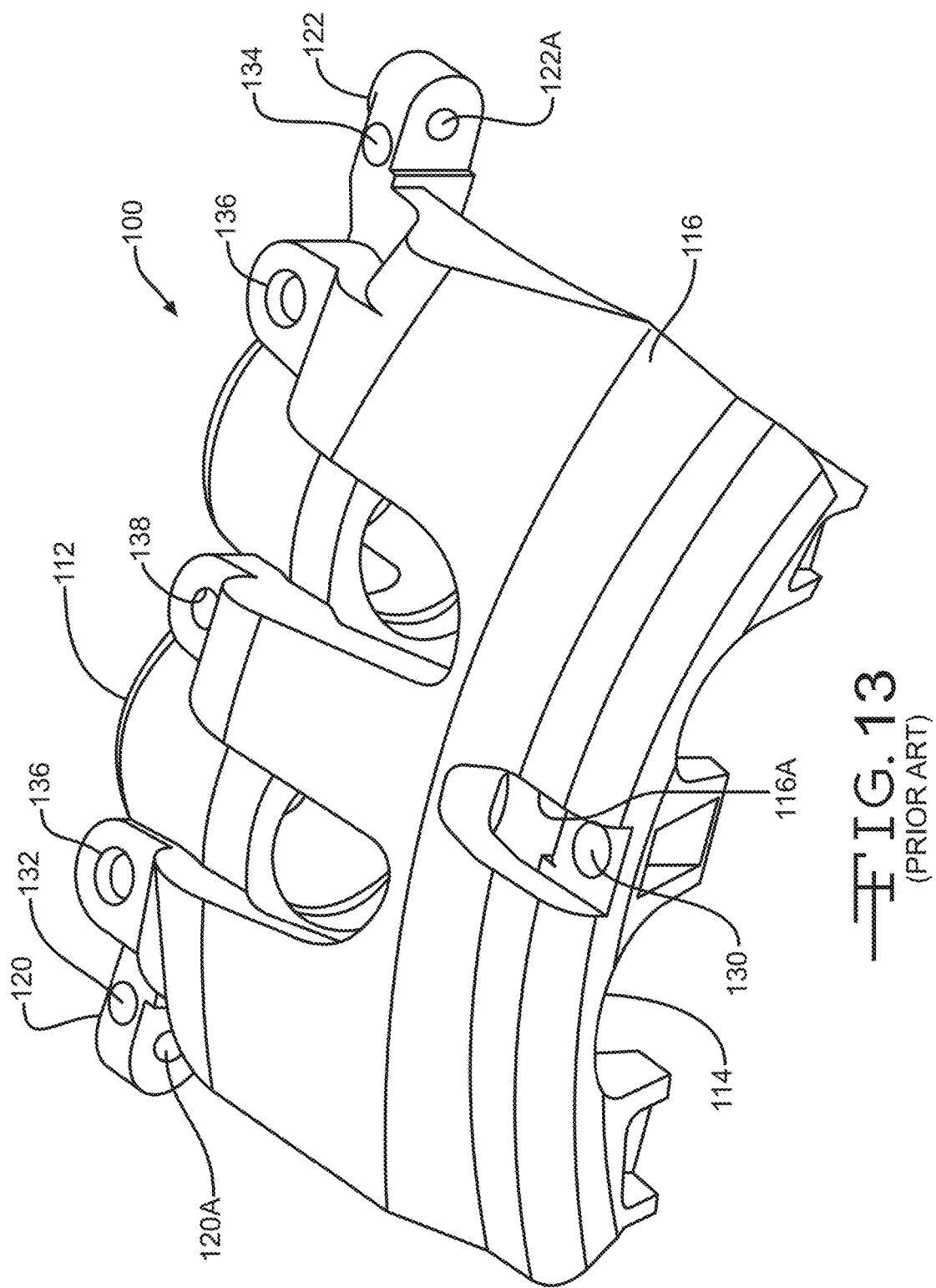
FIG. 13 is a perspective view of a second prior art brake caliper.
Figure 15:
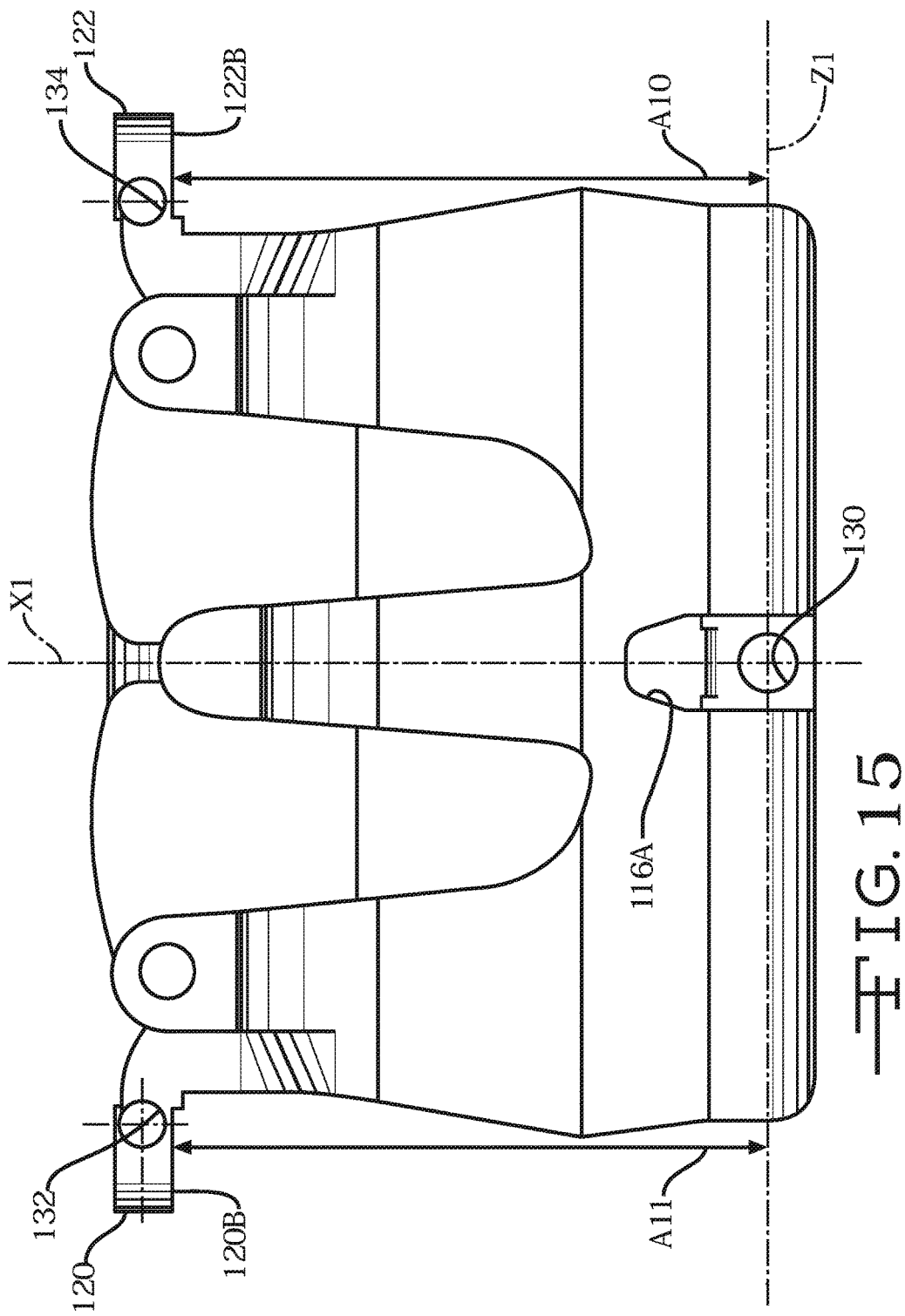
FIG. 15 is a top view of the second prior art brake caliper.

The brake caliper 100 further includes a recess 130, a first pair of surfaces 132 and 134, and a second pair of surfaces 146 and 148 for a purpose to be discussed below. The recess 130 is preferably a generally conical-shaped closed recess, the surfaces 132 and 134 are preferably generally flat surfaces, and the surfaces 146 and 148 are preferably generally angled flat surfaces which have a generally V-shape. Also, the recess 130 and the surfaces 132, 134, 146, and 148 are preferably as-cast surfaces accurately formed during the casting process, although slight cleaning or brushing of one or more of the recess 130 and the surfaces 132, 134, 146, and 148 may occur subsequent to the casting process. Also, for discussion purposes, the surfaces 132 and 134 are shown in FIGS. 13 and 15 as being round surfaces but actually the surfaces 132 and 134 are not round nor visibly distinct or different from the adjacent surface of the caliper in that portion thereof. The brake caliper 100 further includes one of a pair of bleed ports 136 (only one of which is machined depending whether the brake caliper is a left hand or right hand caliper), a common inlet port 138, and a pair of piston bores 140.

Figure 17:
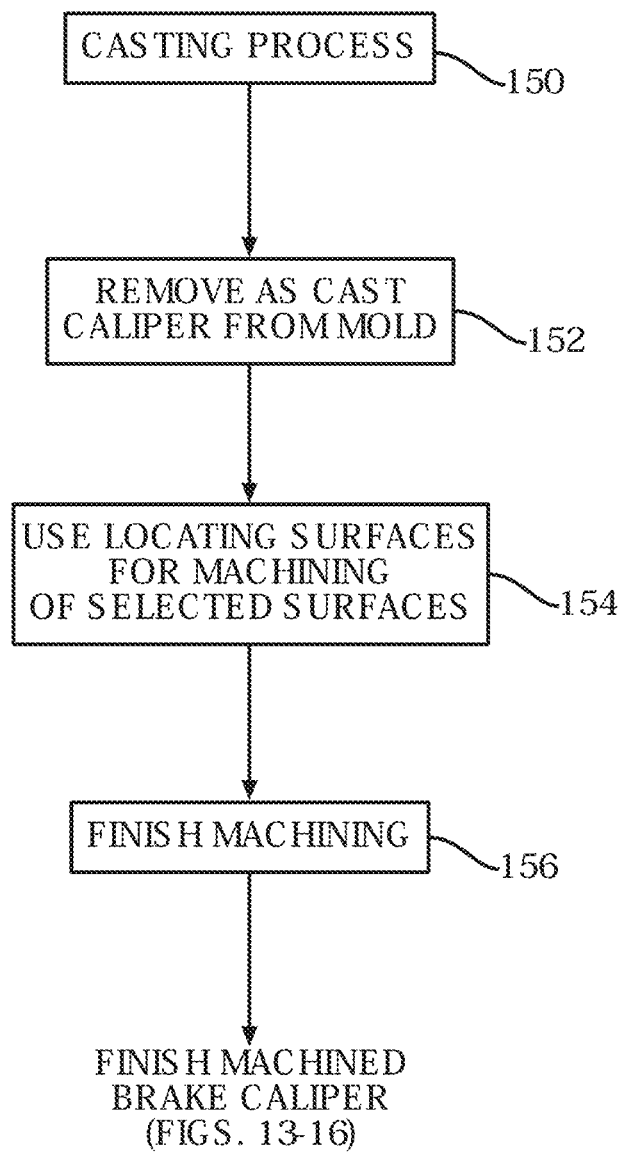
FIG. 17 is a block diagram showing a sequence of steps for producing the second prior art brake caliper illustrated in FIGS. 13-16.
Figure 18:
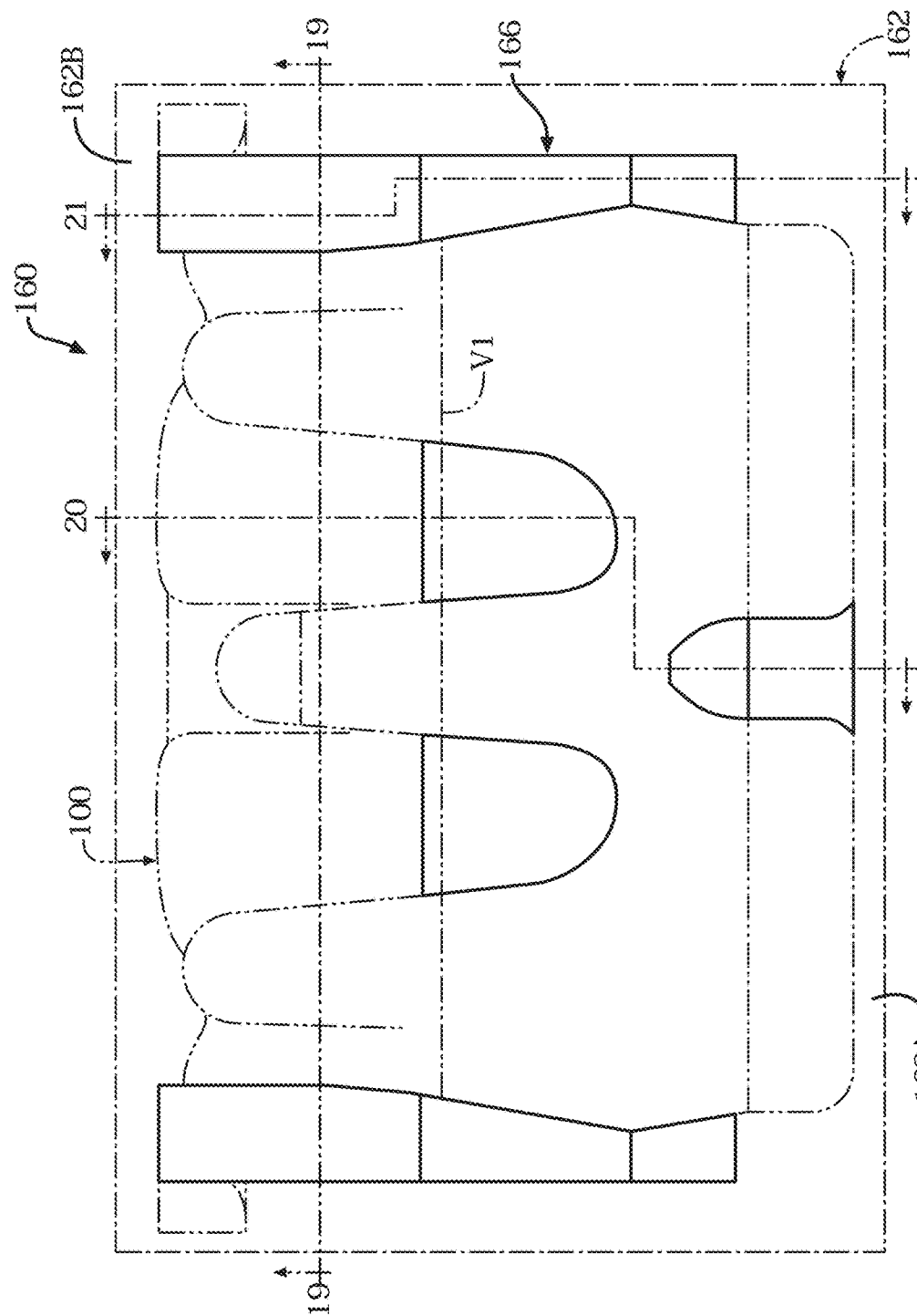
FIG. 18 is a top view of a portion of a second prior art casting apparatus adapted for use in producing the second prior art brake caliper.

Referring now to FIG. 17, there is illustrated a block diagram showing a sequence of steps for the second prior art brake caliper 100. As shown therein, the second prior art brake caliper 100 is produced in a casting apparatus, indicated generally at 160 in FIGS. 18-21, during a single plane vertical split line casting process during step 150. To accomplish this, the casting process uses a mold 162 having two mold or pattern sections 162A and 162B which are disposed with respect to one another so as to produce a vertical split between the mold sections 162A and 162B, which is illustrated for discussions purposes by vertical split line V1 in FIGS. 18 and 20-23. The mold section 162A defines a first side or outboard side mold section and the mold section 162B defines a second side or inboard side mold section. An inside face of the mold section 162A matches an inside face of the mold section 162B.

As shown in FIGS. 18-21, the casting apparatus 160 includes a core member, indicated generally at 166 and shown in solid lines, disposed in the mold 162 in a predetermined position.

Figure 19:
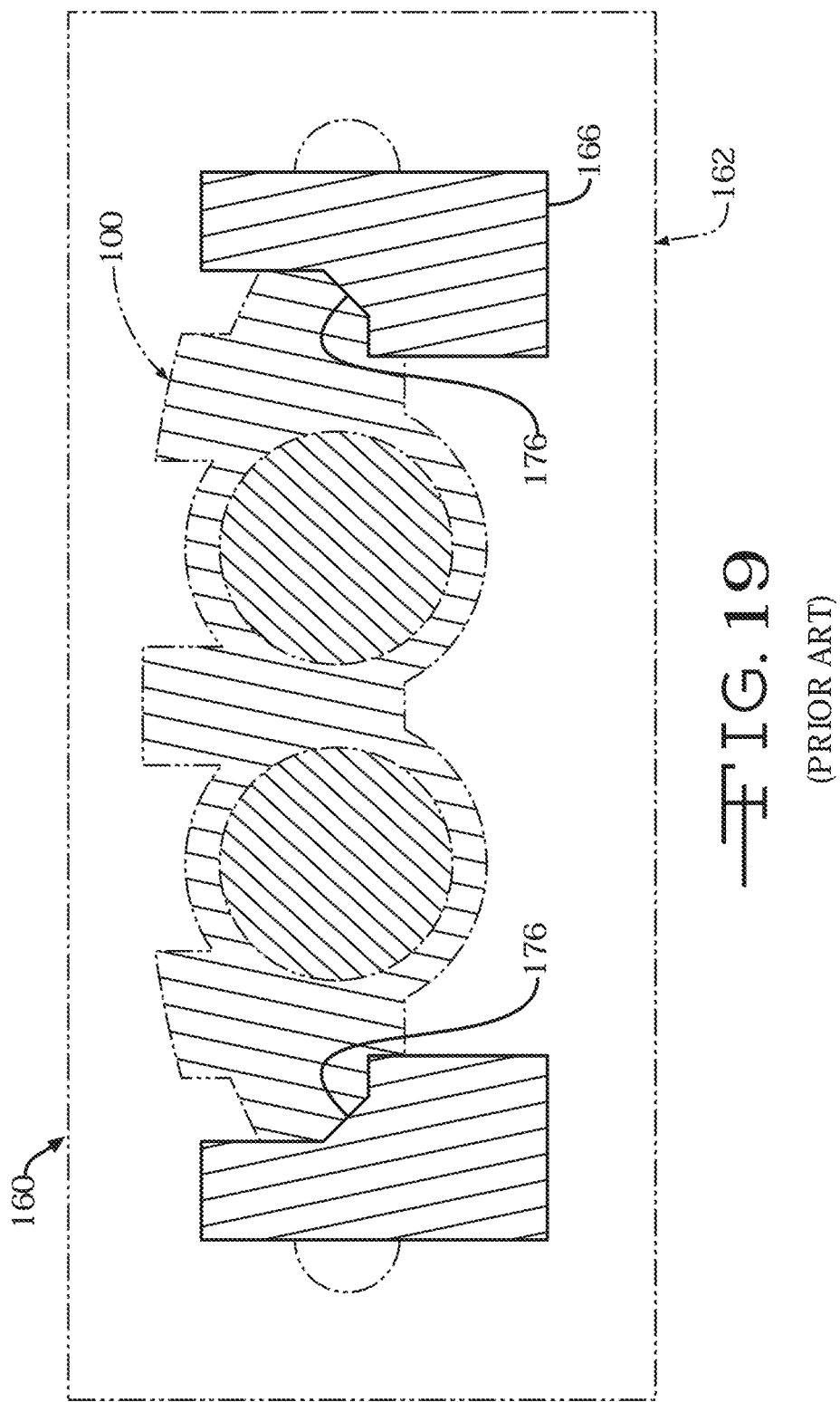
FIG. 19 is a sectional view taken along line 19-19 of prior art FIG. 18.
Figure 20:
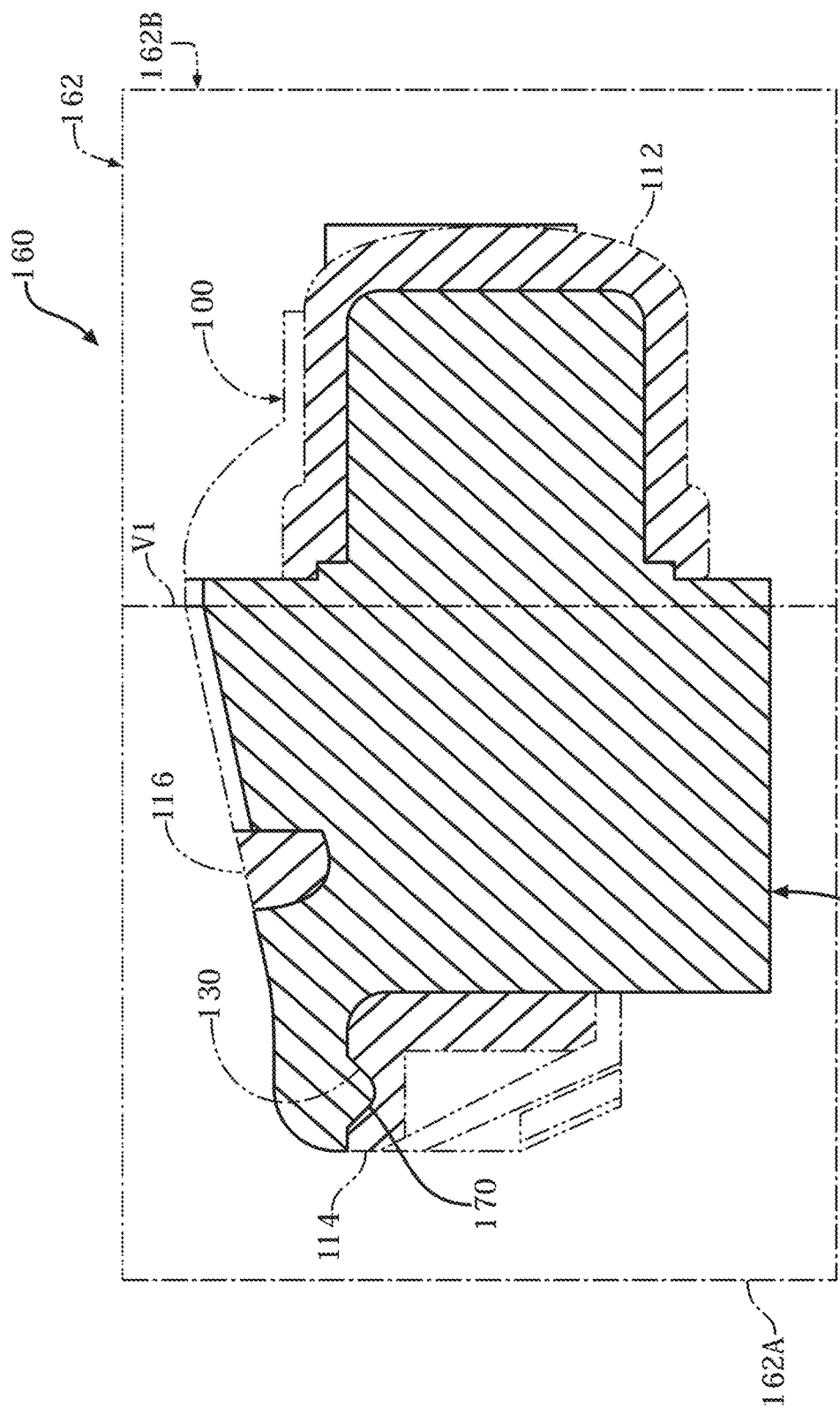
FIG. 20 is a sectional view taken along line 20-20 of prior art FIG. 18.
Figure 21:
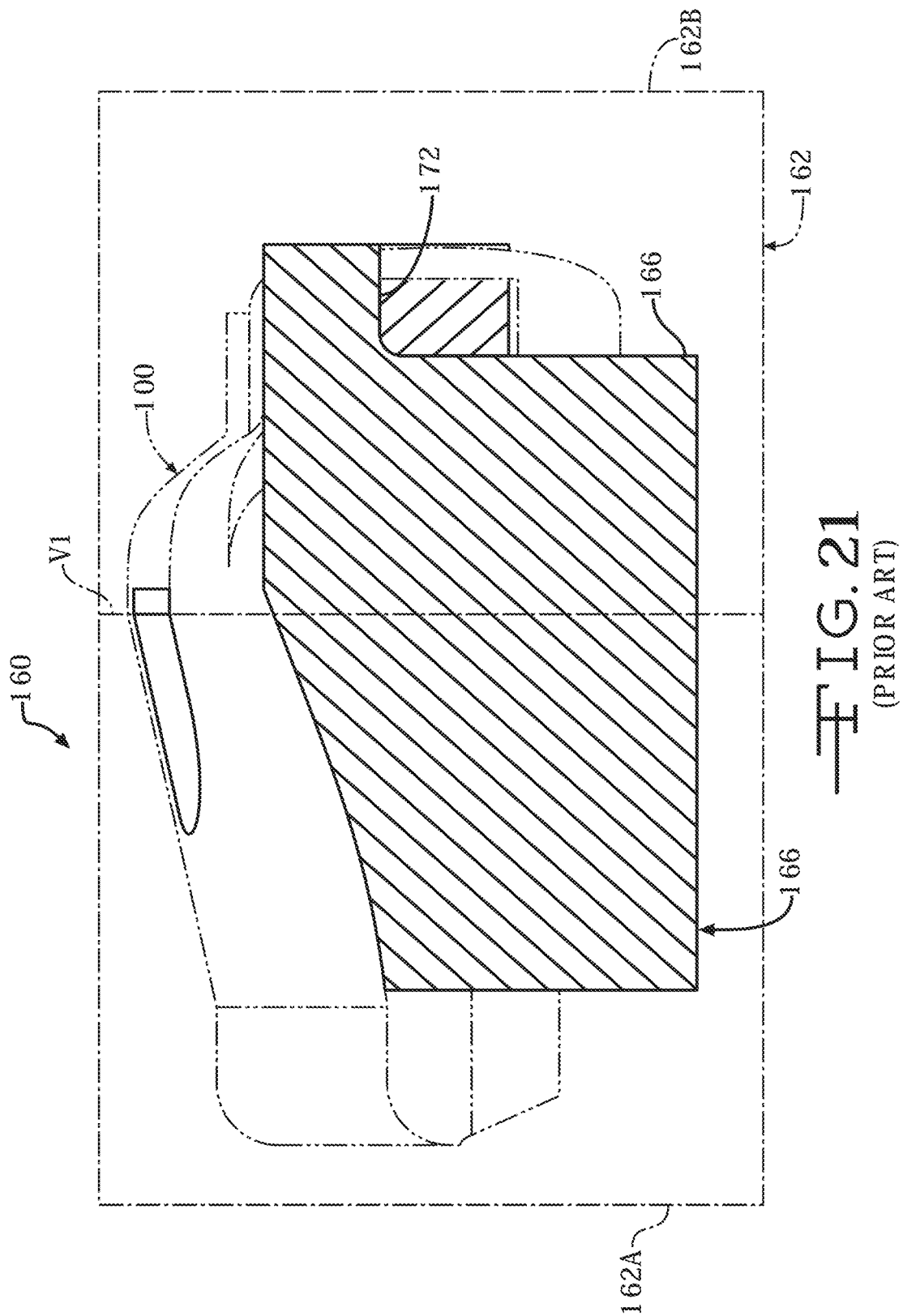
FIG. 21 is a sectional view taken along line 21-21 of prior art FIG. 18.
Figure 22:
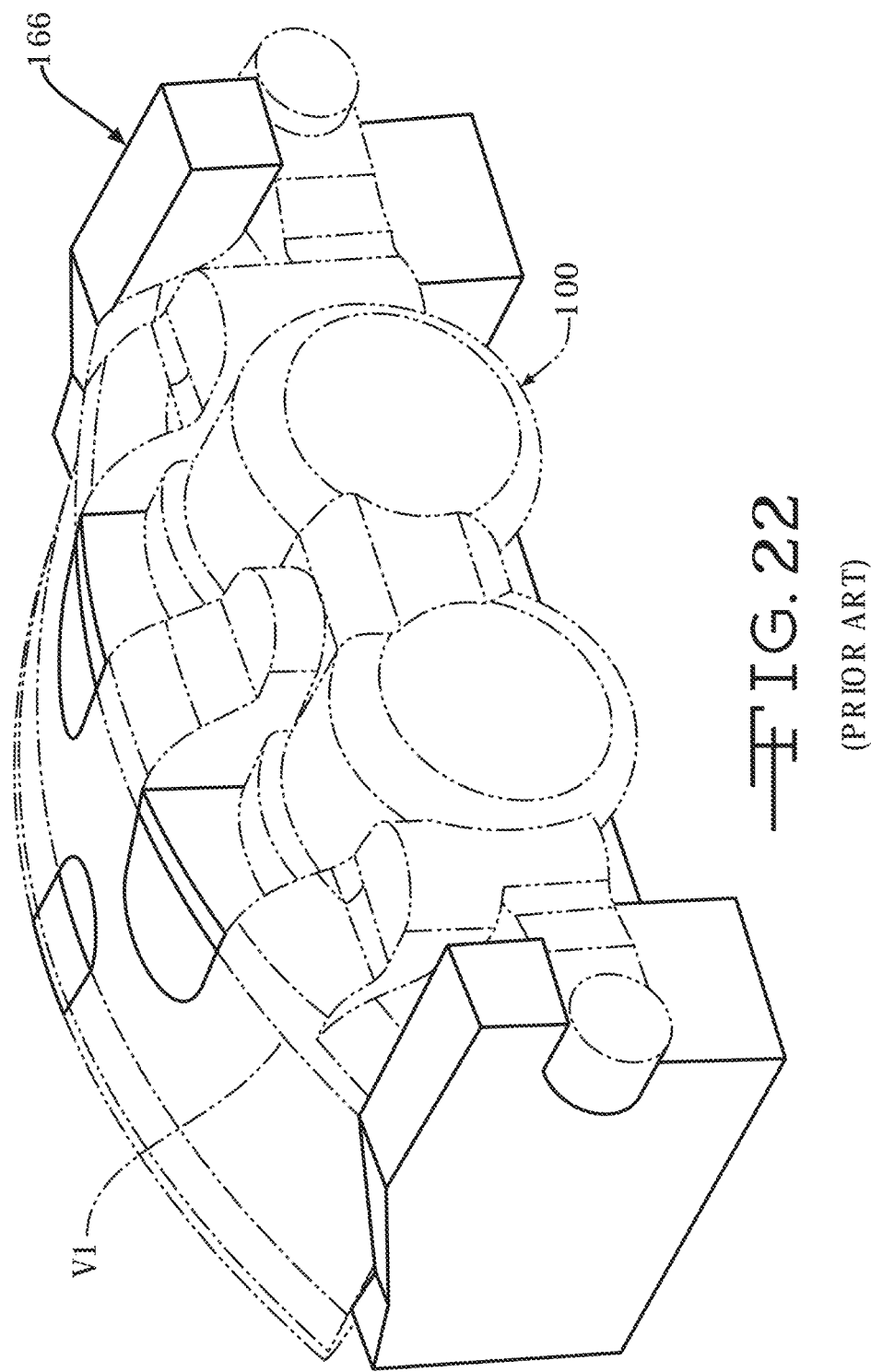
FIG. 22 is a perspective view of the second prior art casting apparatus with the mold portion thereof not being shown.
Figure 23:
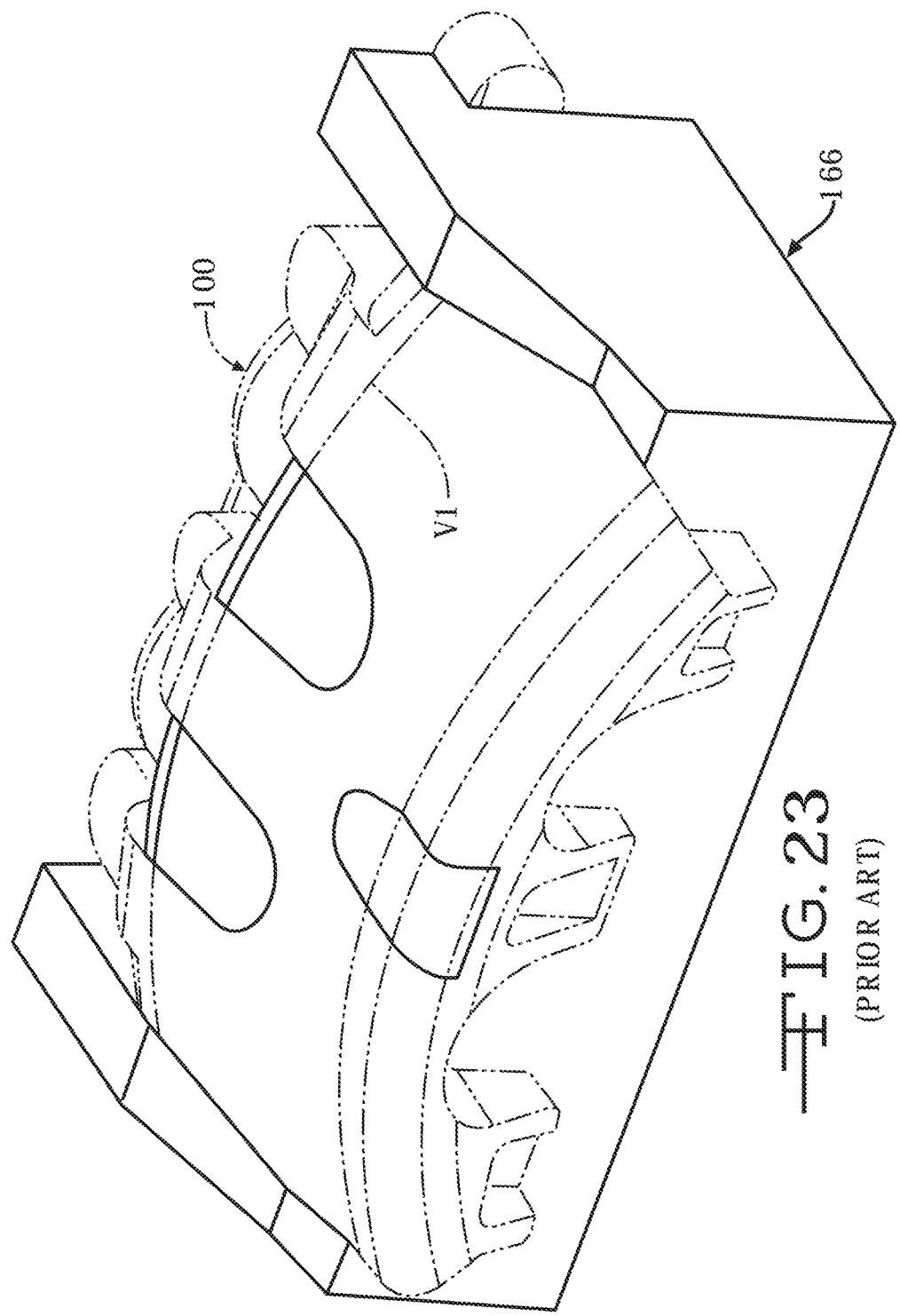
FIG. 23 is another perspective view of the second prior art casting apparatus with the mold portion thereof not being shown.

As best shown in FIG. 20, the core member 166 includes a first "male" extension or protuberance 170. The first extension 170 has a generally conical shape and is effective to produce the conical recess 130 in the brake caliper 100. Also, as best shown in FIG. 21, the core member 166 includes a pair of second male extensions or protuberances (only one of such extensions shown in FIG. 21 at 172). The second extensions 172 are generally flat planar surfaces and are effective to produce the generally flat surfaces 132 and 134 on the brake caliper 100. In addition, as best shown in FIG. 19, the core member 166 includes a pair of angled surfaces 176. The surfaces 176 are effective to produce the generally V-shaped angled flat surfaces 146 and 148 on the brake caliper 100.

Next, the as-cast brake caliper 100 is removed from the casting apparatus during step 152. As discussed above, the as-cast brake caliper 100 includes the conical recess 130 and the flat surfaces 132, 134, 146, and 148. As will be discussed below, the recess 130 and the surfaces 132 and 134 define locating surfaces and the surfaces 146 and 148 define clamping surfaces.

Figure 14:
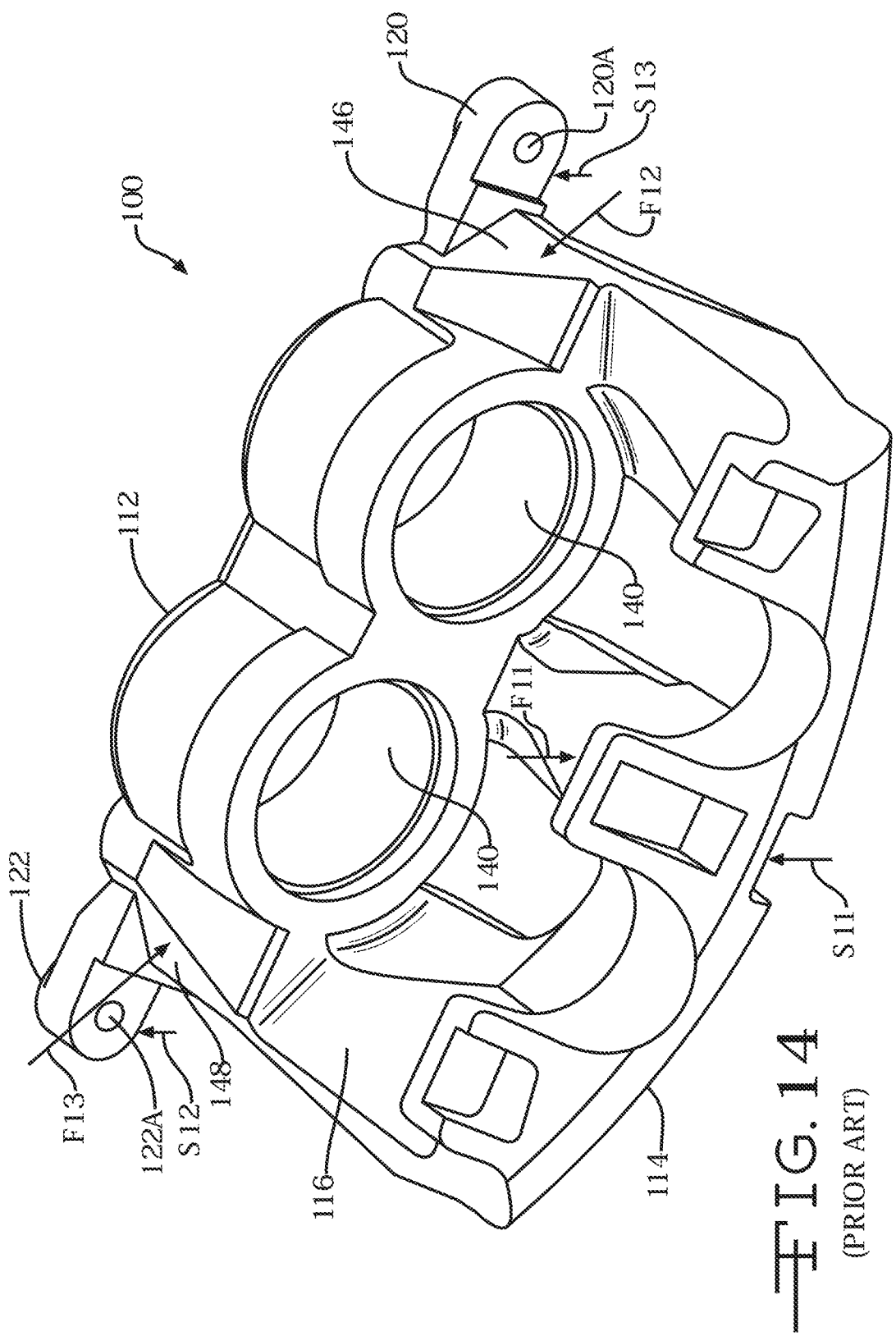
FIG. 14 is another perspective view of the second prior art brake caliper.

Following this, selected surfaces of the as-cast brake caliper 100 are machined to predetermined tolerances using a known machining apparatus (not shown) during step 154. To accomplish this, the conical recess 130 and the surfaces 132 and 134 are used as datum or locating surfaces. In particular, the caliper 100 is positioned in an "upside down" position (i.e., bridge side facing down), as shown in FIG. 14, and supported in this position by a suitable first locating/supporting member (designated by arrow S11 in FIG. 14), which is disposed in the conical recess 130, and a pair of second locating/supporting members (designated by arrows S12 and S13 in FIG. 14), which engage the surfaces 132 and 134, respectively, to define a first horizontal plane Y1 of the as-cast brake caliper 100. Such a suitable first member is the predetermined sized ball 60 shown in phantom in FIG. 2 in conjunction with the first prior art brake caliper 10; and a suitable pair of second members are a pair of pins with flat heads.

Next, while in this position, a first clamp member (not shown), which is operative to clamp and apply a first force F11 (shown in FIG. 14), to a selected surface of a middle finger of the outboard leg portion 114 of the caliper 100 generally opposite the ball 60 in the recess 130, and a pair of second clamp members (not shown), which are operative to clamp and apply a pair of second forces F12 and F13 (shown in FIG. 14), to the angled clamping surfaces 146 and 148 of the caliper, respectively, are used to define a second vertical plane X1 and also a third vertical plane Z1 of the caliper 100. Alternatively, other suitable methods can be used to hold or clamp the caliper 100 to enable the surfaces 130, 132, 134, 146, and 148 to be used as locating surfaces to determine the planes X1, Y1, and Z1 if so desired. The X1 plane and the Z1 plane bisect one another in a generally perpendicular manner and the Y1 plane and the X1 plane bisect one another in a generally perpendicular manner. Alternatively, the orientation of one or more of the three planes X1, Y1, and Z1 can be other than illustrated.

Once the above described three planes X1, Y1, and Z1 of the single plane vertical split line as-cast brake caliper 100 have been established and with the forces F11, F12, and F13 applied, selected surfaces of the brake caliper 100 are machined to predetermined tolerances. The selected surfaces include the machining of ears 120 and 122 and the machining of a pair of rough cast piston bores 140. In particular, as shown in FIG. 15, an outer surface 122B of the ear 122 is machined a predetermined distance A10 relative to the Z1 axis so as to define a flat outer surface which is in parallel relationship with the Z1 axis. Similarly, an outer surface 120B of the ear 120 is machined a predetermined distance A11 relative to the Z1 axis so as to define a flat outer surface which is in parallel relationship with the Z axis. The distances A10 and A11 are the same.

Figure 16:
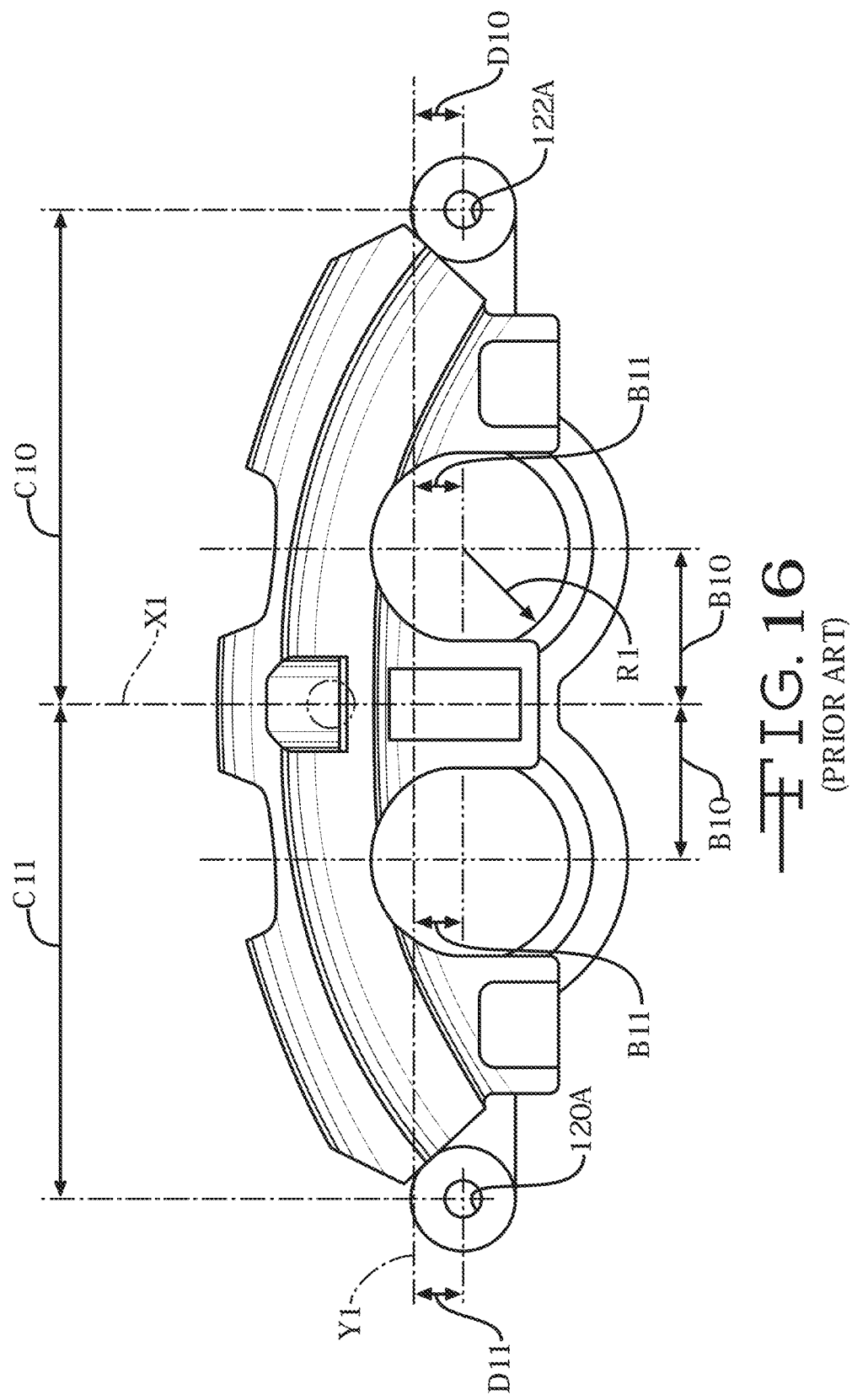
FIG. 16 is an inboard facing side view of the second prior art brake caliper.

Also, as shown in FIG. 16, the opening 122A is machined a predetermined distance C10 with respect to the X1 axis and a predetermined distance D10 with respect to the Y1 axis. Similarly, the opening 120A is machined a predetermined distance C11 with respect to the X1 axis and a predetermined distance D11 with respect to the Y1 axis. The distances C10 and C11 are the same and the distances D10 and D11 are the same. In addition, as shown in FIG. 16, the piston bores 140 are machined with respect to the X1 axis a predetermined distance B10 and with respect to the Y1 axis a predetermined distance B11 so as to define piston bore radii R1. Following this, in step 156, other selected surfaces of the brake caliper 100 are machined to predetermined tolerances to produce the finish machined brake caliper 100. To accomplish this, one or more of the surfaces 120B and 122B, the apertures 120A and 122A, and the piston bores 140 are used as datum points to carry out the finish machining of the brake caliper 100 during step 156.

Turning now to FIGS. 24-27, there is illustrated an embodiment of a brake caliper, indicated generally at 200, produced in accordance with the present invention. It should be noted that while this invention will be described and illustrated in conjunction with the particular brake caliper structure disclosed herein, it will be appreciated that this invention may be used in conjunction with other brake caliper structures adapted for use in other kinds of vehicle disc brake assemblies. For example, the invention may be used in conjunction with opposed or non-opposed piston types of disc brake assemblies having one, or more than one, associated brake piston(s). The illustrated embodiment of the brake caliper 200 of the present invention is formed from any suitable castable material, such as for example, iron, aluminum, and alloys thereof.

The illustrated brake caliper 200 is adapted for use in a "Colette" type of disc brake assembly and is a generally C-shaped single-pot brake caliper. The brake caliper 200 includes an inboard leg portion 212 and an outboard leg portion 214 which are interconnected by an intermediate bridge portion 216 having an opening 216A formed therein. The outboard leg portion 214 includes a first finger 214A and a second finger 214B, both of which may be rounded or filleted for improved handling and to reduce pressure by the brake caliper 200 against an insulator (not shown).

The intermediate bridge portion 216 of the illustrated embodiment of the brake caliper 200 has an upper side 217A and a lower side 217B. The inboard leg 212 of the brake caliper 200 includes a pair of ears 220 and 222 extending from the inboard leg 212 and a "third" lug 224. "First" and "second" lugs are the ears 220 and 222. Each of the ears 220 and 222 includes an opening 220A and 222A, respectively, formed therethrough. The openings 220A and 222A are adapted to receive a portion of a slide pin bolt (not shown) for supporting the brake caliper 200 for sliding movement during actuation thereof in a known manner. In the illustrated embodiment, the openings 220A and 222A are non-threaded or through holes. However, the openings 220A and 222A can be threaded holes depending upon the particular vehicle disc brake assembly design.

In the illustrated embodiment of the brake caliper 200, the third lug 224 is adapted to mount a brake actuator (schematically shown in FIG. 25 by reference character BA) to the brake caliper 200. To accomplish this, the third lug 224 may include a threaded or through hole to which the brake actuator BA is mounted. The brake actuator may be any suitable kind of actuating device, such as for example an electric parking brake actuator. Alternatively, the third lug 224 may be used to mount other kinds and/or types of brake actuators known to those skilled in the art to the brake caliper 200, for example, a hydraulic or pneumatic brake actuator and/or to secure the brake caliper 200 to a suitable apparatus for subsequent processing and/or machining, such for example, to a lathe.

Figure 24:
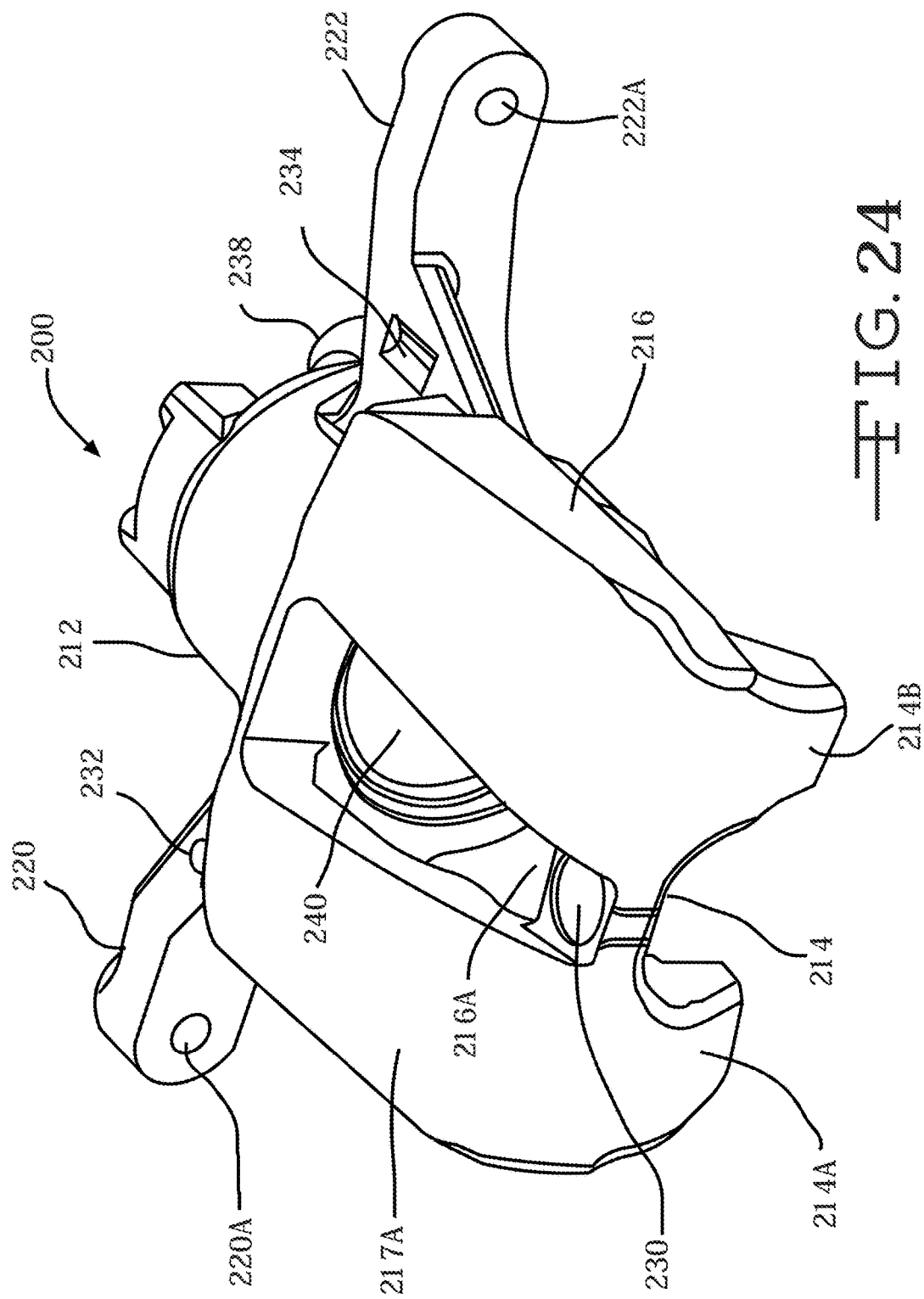
FIG. 24 is a perspective view of an embodiment of a brake caliper produced in accordance with the present invention.
Figure 26:
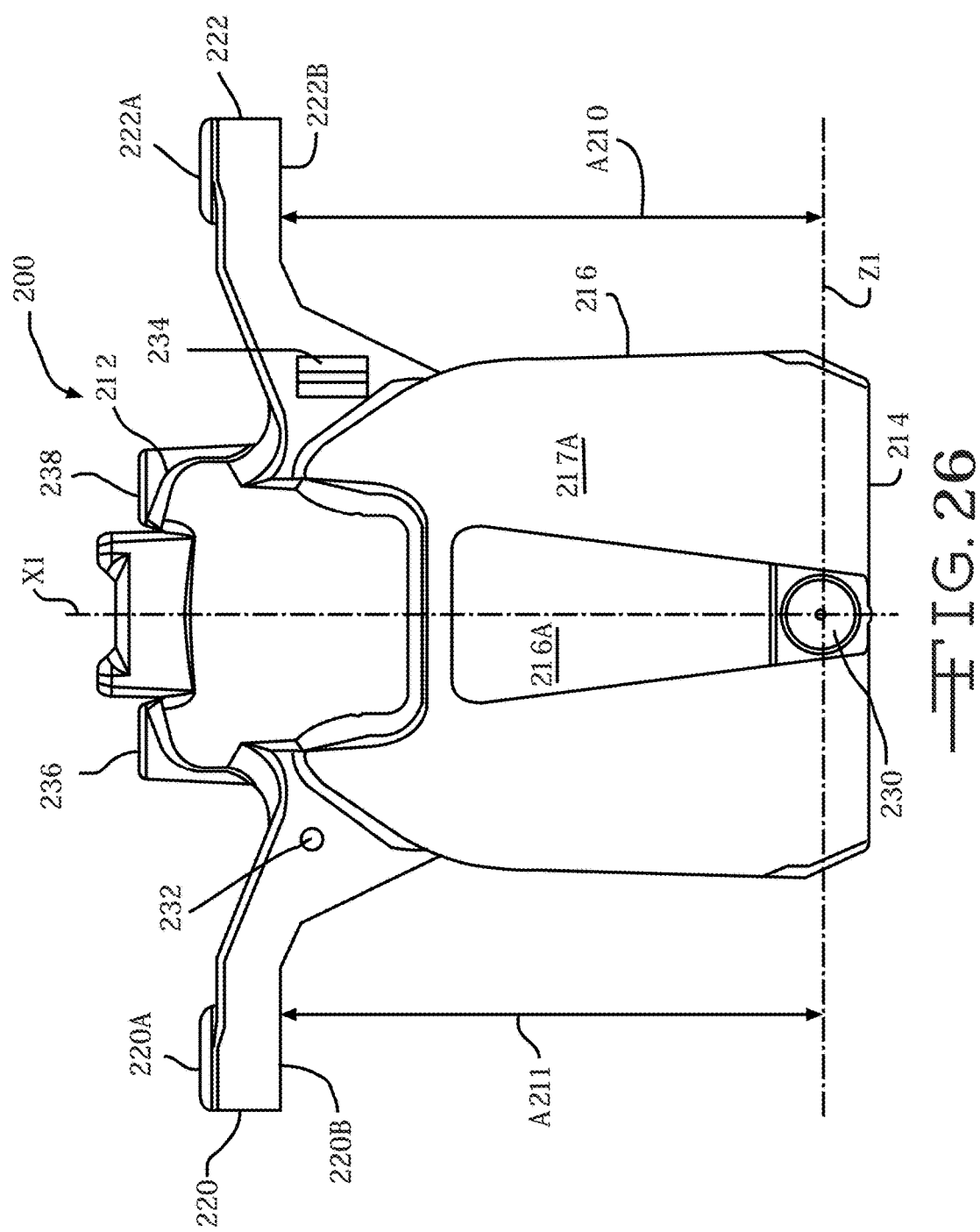
FIG. 26 is a top view of the brake caliper of the present invention.

In the illustrated embodiment, the brake caliper 200 further includes a recess 230, a first pair of surfaces 232 and 234, and a second pair of surfaces 246 and 248 for a purpose to be discussed below. In the illustrated embodiment, the recess 230 is preferably a generally conical-shaped closed recess, the surface 232 is a generally flat surface, the surface 234 is a generally channel-shaped depression surface. In the illustrated embodiment, the surfaces 246 and 248 are preferably generally angled flat surfaces, which in this embodiment have a generally V-shape, and the surfaces 232 and 234 are located on ears 220 and 222, respectively. Alternatively, the surfaces 232 and 234 may be located on the inboard leg portion 212. Also, the recess 230 and the surfaces 232, 234, 246, and 248 are preferably as-cast surfaces accurately formed during the casting process, although slight cleaning or brushing of one or more of the recess 230 and the surfaces 232, 234, 246, and 248 may occur subsequent to the casting process. Also, for discussion purposes, the surface 232 is shown in FIGS. 24 and 26 as being a round surface but actually the surface 232 is not round nor visibly distinct or different from the adjacent surface of the caliper in that portion thereof.

Alternatively, the recess 230 and surfaces 232 and 234 may be as disclosed in U.S. Pat. No. 8,132,612 to Morais et al., the disclosure of which is incorporated herein by reference in entirety. For example, the recess 230 may be a generally flat surface, the surface 232a channel shaped depression terminating in a rounded end, the channel surface 234a generally conical recess, or the recess 230 and the surfaces 232 and 234 may be any combination of generally flat surfaces, channels, grooves, conical recesses, circular recesses, or other shapes suitable for a purpose to be discussed below.

Additionally, the recess 230 may be located on the inboard leg portion 212 with the surfaces 232 and 234 located on the outboard leg portion 214; the recess 230 and the surfaces 232 and 234 may be individually located among the inboard leg portion 212, the outboard leg portion 214, and the bridge portion 216; and/or the recess 230 and the surfaces 232 and 234 may be located, individually or together, on the upper side 217A or lower side 217B of the bridge portion 216.

In the illustrated embodiment, the brake caliper 200 further includes one of a pair of bleed ports 236 and 238 (only one of which is machined depending whether the brake caliper is a left hand or right hand caliper), a bleed port (not shown), and a piston bore 240. As one skilled in the art will readily understand, the fluid supply inlet port 236 and the bleed port 238 may be located on the brake caliper 200 as needed for a specific application of the brake caliper 200. As illustrated, the brake caliper 200 is a single piston brake caliper having a single piston bore 240. Alternatively, the structure of the brake caliper 200 can be other than illustrated if so desired, including structure to accommodate a multiple piston brake caliper. For example, the particular shape of the recess 230 of the brake caliper 200 could be any other suitable shape for a locating or datum surface as discussed below.

Figure 28:
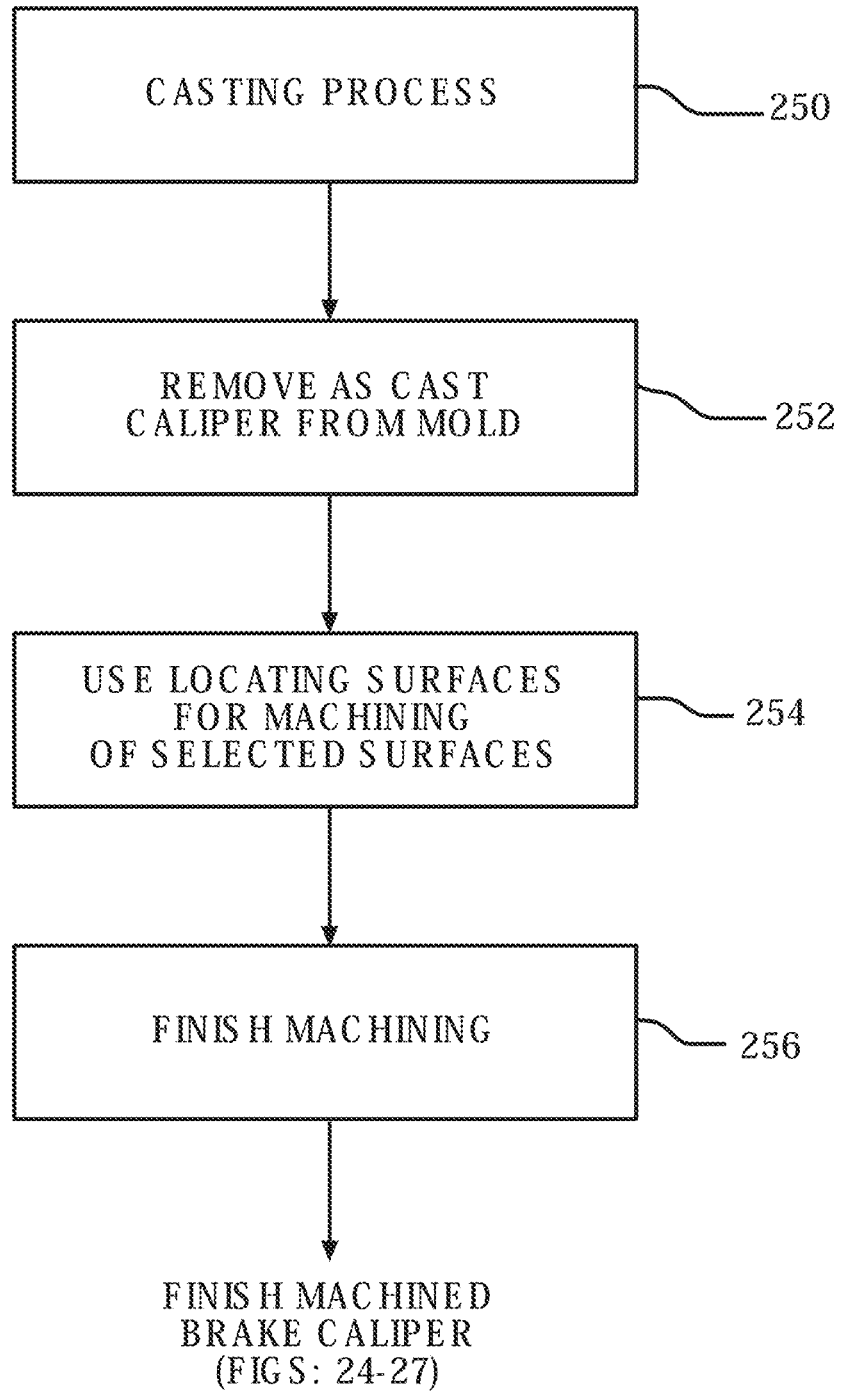
FIG. 28 is a block diagram showing a sequence of steps for producing the brake caliper of the present invention illustrated in FIGS. 24-27.
Figure 29:
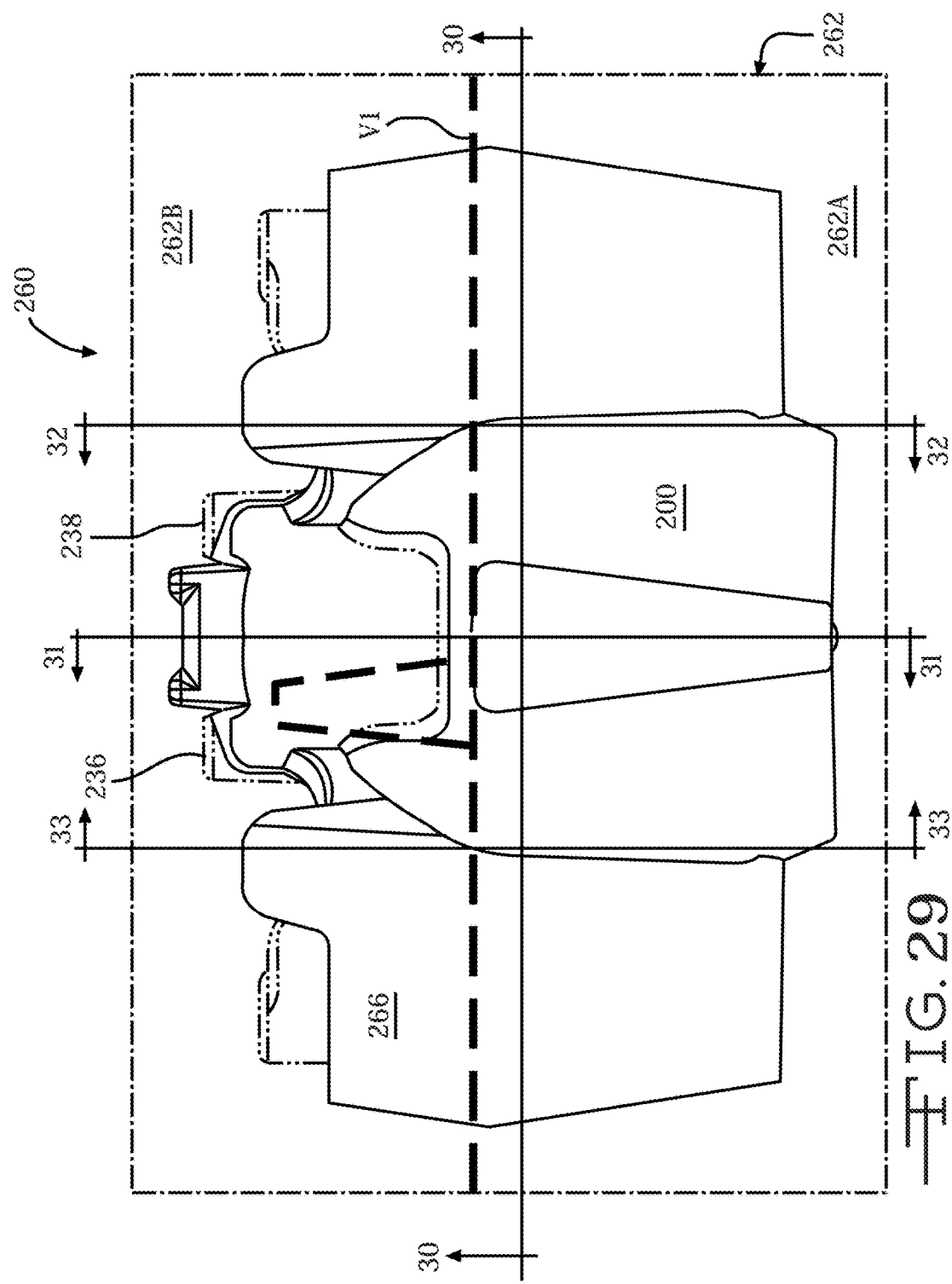
FIG. 29 is a top view of a portion of a casting apparatus according to the present invention adapted for use in producing the brake caliper of the present invention.

Referring now to FIG. 28, there is illustrated a block diagram showing a sequence of steps for producing the embodiment of the brake caliper 200 of the present invention. As shown therein, the brake caliper 200 of this invention is produced in a casting apparatus, indicated generally at 260 in FIGS. 29-35, during a multiple zone vertical jogged split line casting process during step 250. To accomplish this, the casting process uses a mold 262 having two mold or pattern sections 262A and 262B. The mold sections 262A and 262B are disposed with respect to one another so as to produce a "unique" multiple zone or "jogged" vertical split between the mold sections 262A and 262B, which is illustrated for discussions purposes by a "heavy dashed" jogged vertical split line V1 in FIGS. 29 and 31-35, when the mold 262 is assembled. As used herein, "jogged vertical split"

means an interface between the mold sections 262A and 262B is has at least two generally planar zones with a horizontal distance H between the at least two zones. In the illustrated embodiment, the mold section 262A defines a first side or outboard side mold section and the mold section 262B defines a second side or inboard side mold section.

As shown in FIGS. 29-35 the casting apparatus 260 includes a core member, indicated generally at 266 and shown in solid lines disposed in the mold 262 in a predetermined position. For example, the core member 266 may be disposed in the mold 262 by an interference fit. The core member 266 is made of a known suitable material, such as for example, sand and resin, and the mold 262 is made of a suitable material, such as for example, a mixture of sand, bentonite (clay), water, and coal dust. Thus, it is understood that the core member 266 is a consumable or non-reusable member which can be used only one time in the casting process. The mold 262 is also consumable. A non-consumable or reusable pattern makes an impression into the mold 262 and can be used repeatedly before it wears out. Alternatively, the construction and/or material for the mold 262 and/or core member 266 can be other than illustrated and described if so desired.

Figure 31:
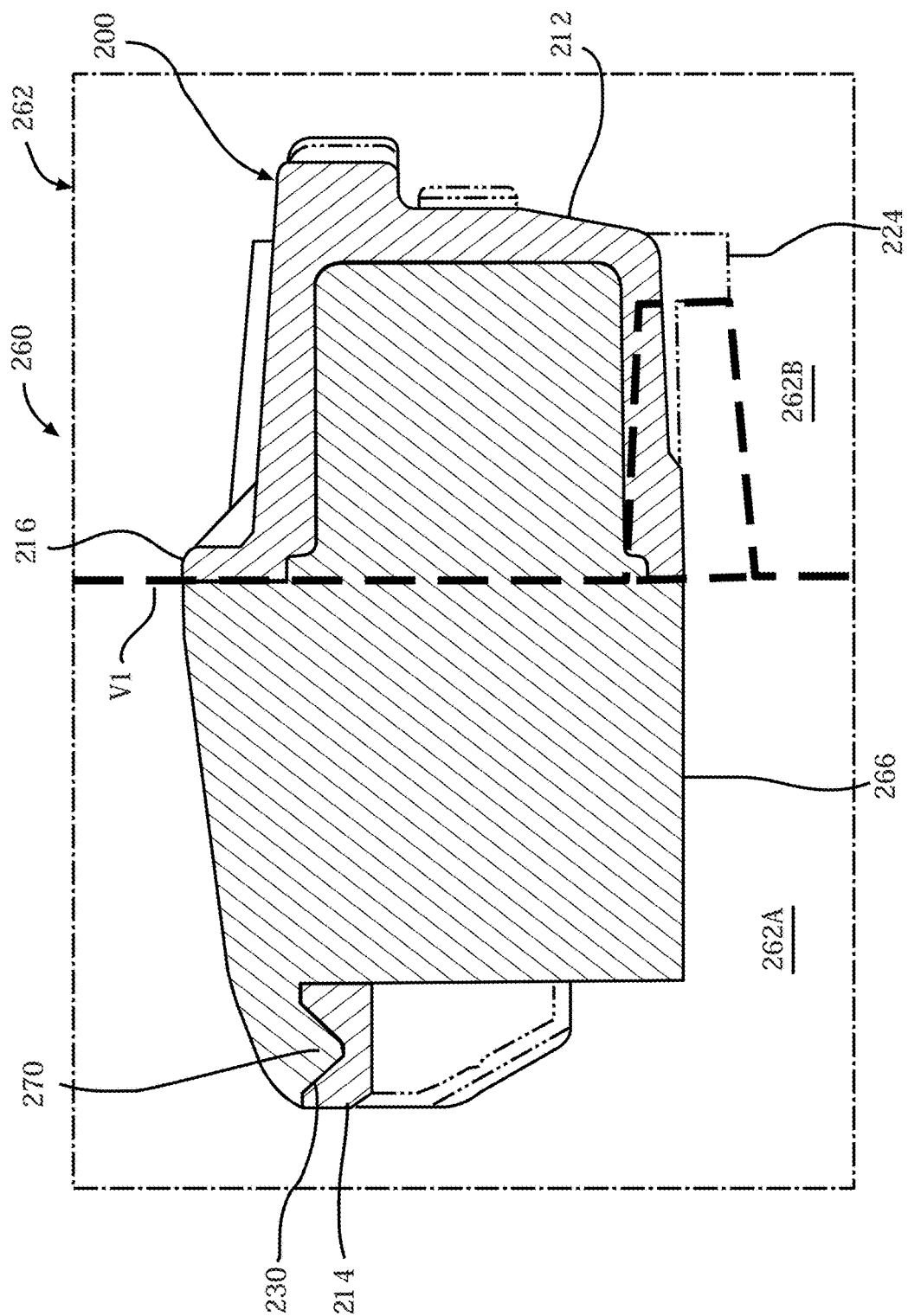
FIG. 31 is a sectional view taken along line 31-31 of FIG. 29.

As best shown in FIG. 31, the core member 266 includes a first "male" extension or protuberance 270. The first extension 270 has a generally conical shape and is effective to produce the conical recess 230 in the brake caliper 200. Alternatively, the shape of the first extension 270, and therefore the resulting recess 230, may be other than illustrated and described if so desired.

Figure 32:
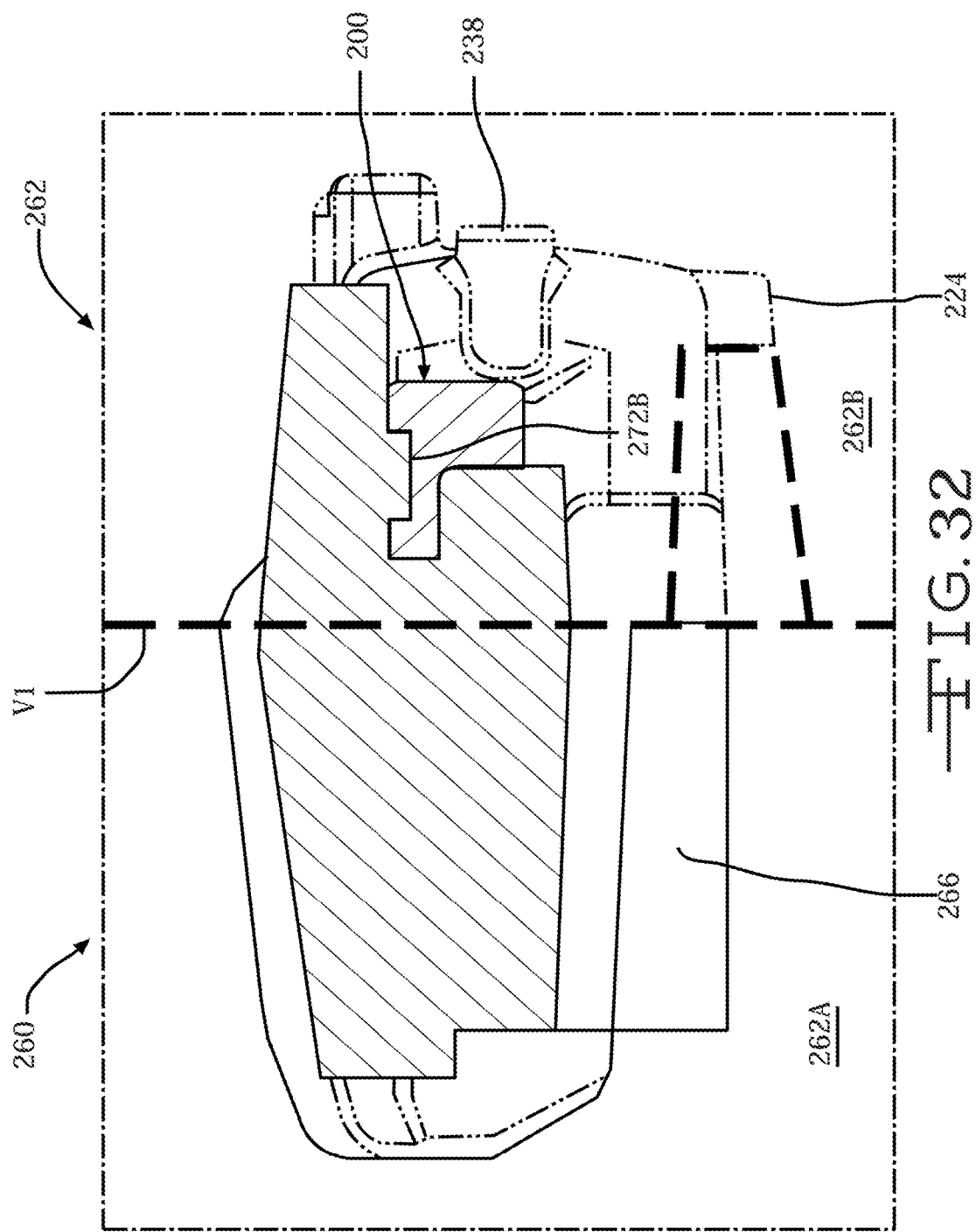
FIG. 32 is a sectional view taken along line 32-32 of FIG. 29.
Figure 33:
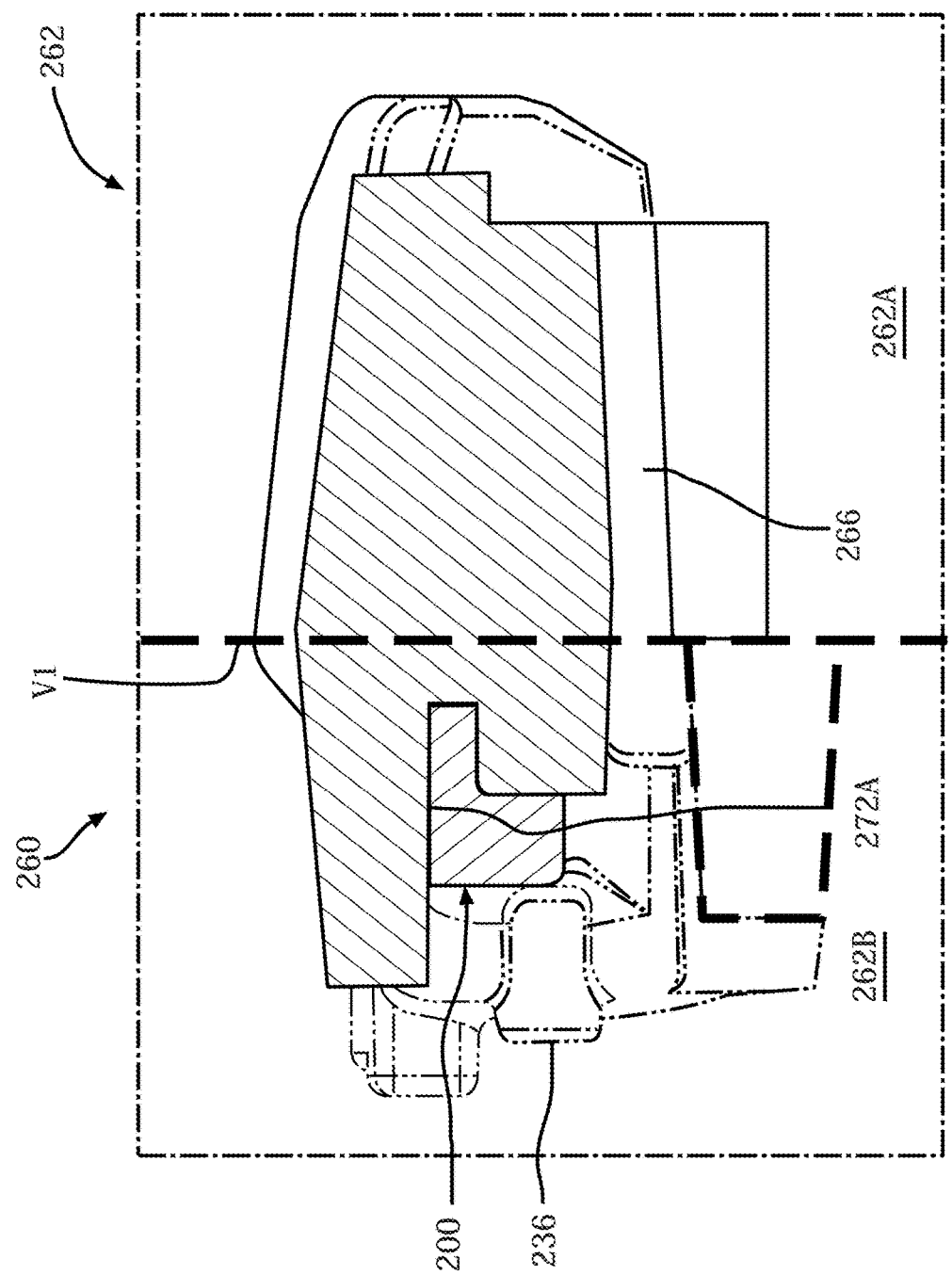
FIG. 33 is a sectional view taken along line 33-33 of FIG. 29.

Also, as best shown in FIGS. 32 and 33, the core member 266 includes a pair of second male extensions or protuberances 272A and 272B. The pair of second male extensions 272A and 272B are shaped to produce the corresponding surfaces 232 and 234. The second extension 272A is a generally flat planar surface and is effective to produce the generally flat surface 232 on the brake caliper 200. The second extension 272B has a generally trapezoidal shaped and longitudinally extending cross section (the second extension 272B being shown longitudinally in FIG. 32) and is effective to produce the channel surface 234 on the brake caliper 200. Alternatively, the shape of one or both of the second male extensions 272A and 272B, and therefore resulting surfaces 232 and 234, respectfully, may be other than illustrated and described if so desired.

Figure 30:
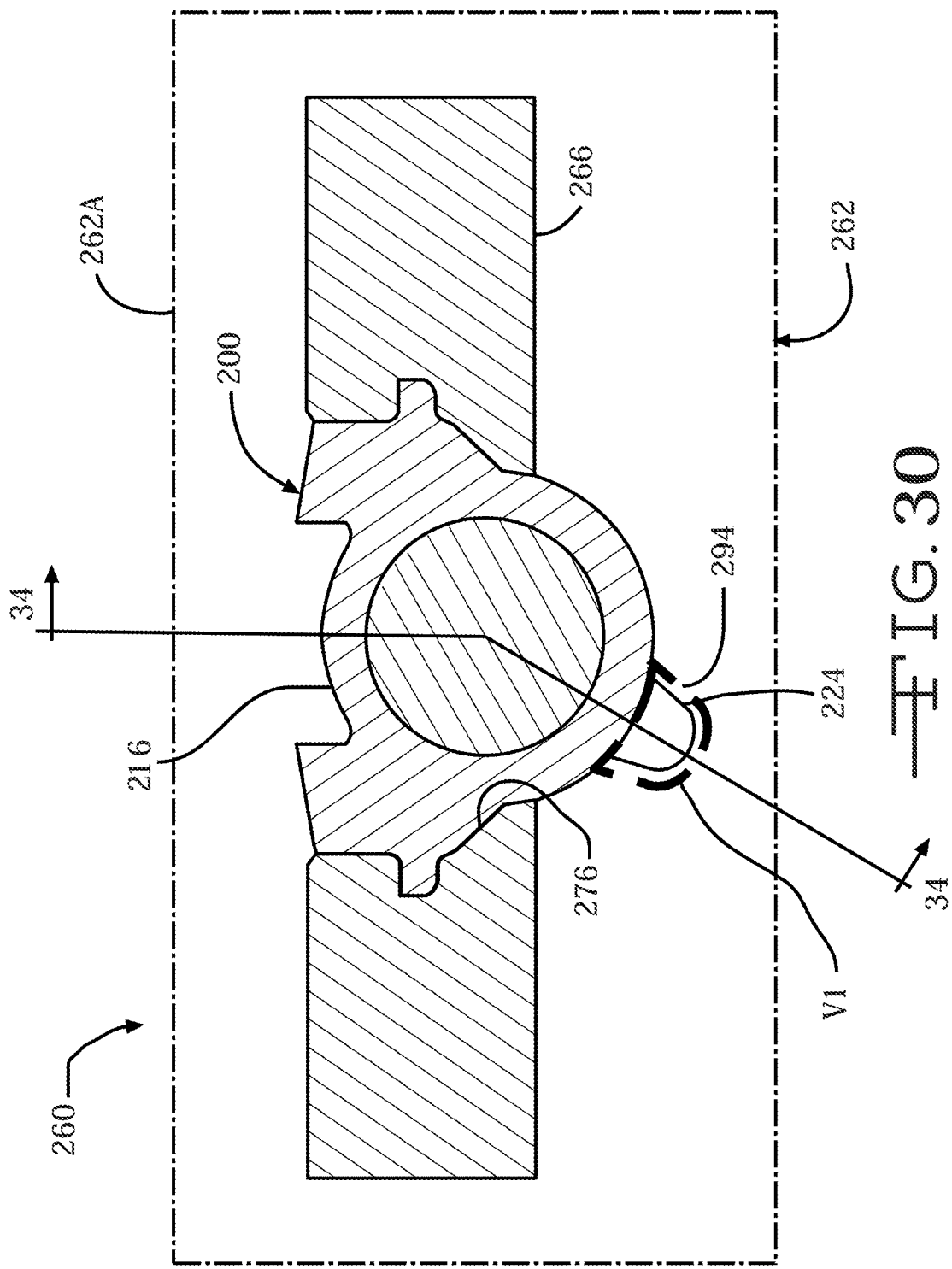
FIG. 30 is a sectional view taken along line 30-30 of FIG. 29.

In addition, as best shown in FIG. 30, the core member 266 includes a pair of angled surfaces 276. The surfaces 276 are effective to produce the generally V-shaped angled flat surfaces 246 and 248 on the brake caliper 200.

Figure 34:
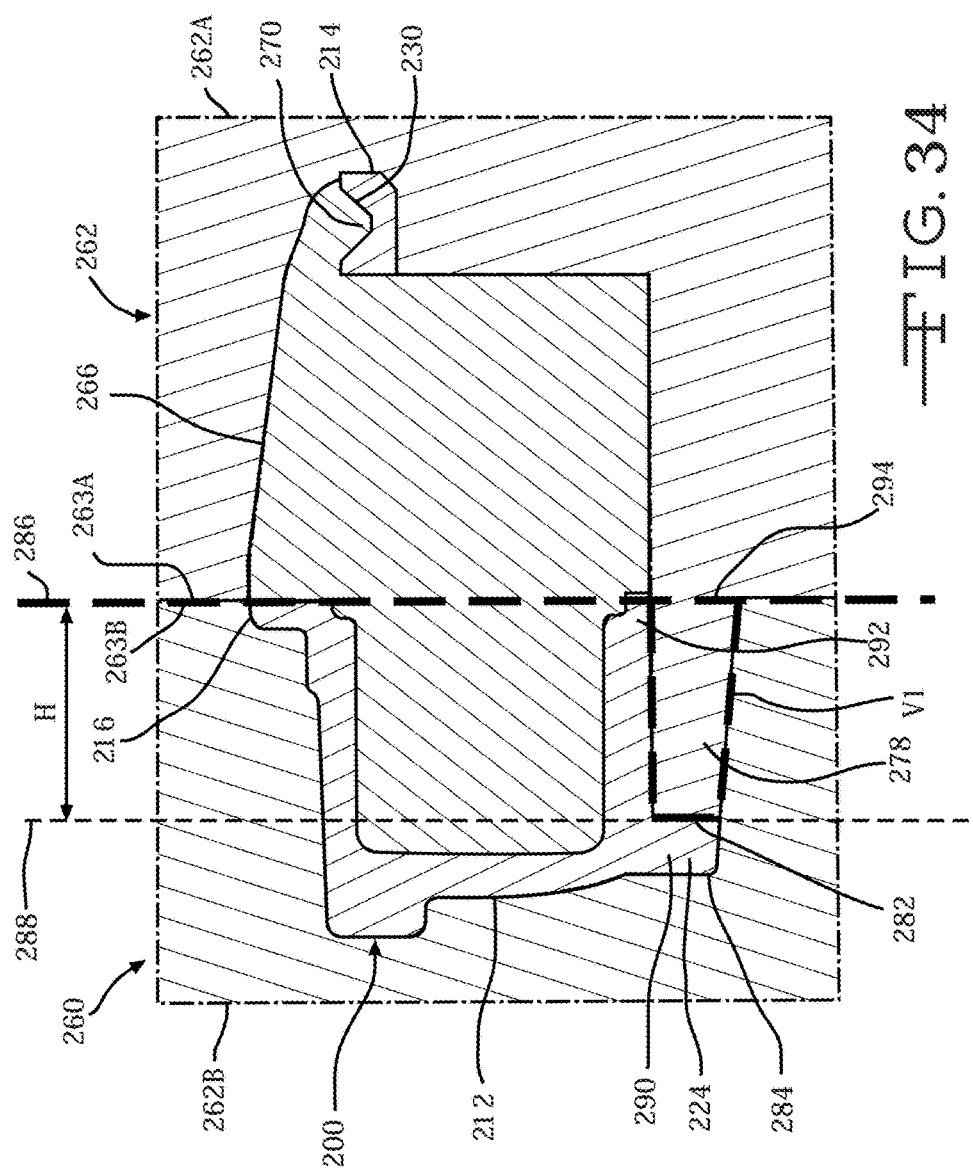
FIG. 34 is a sectional view taken along line 34-34 of FIG. 29.
Figure 35:
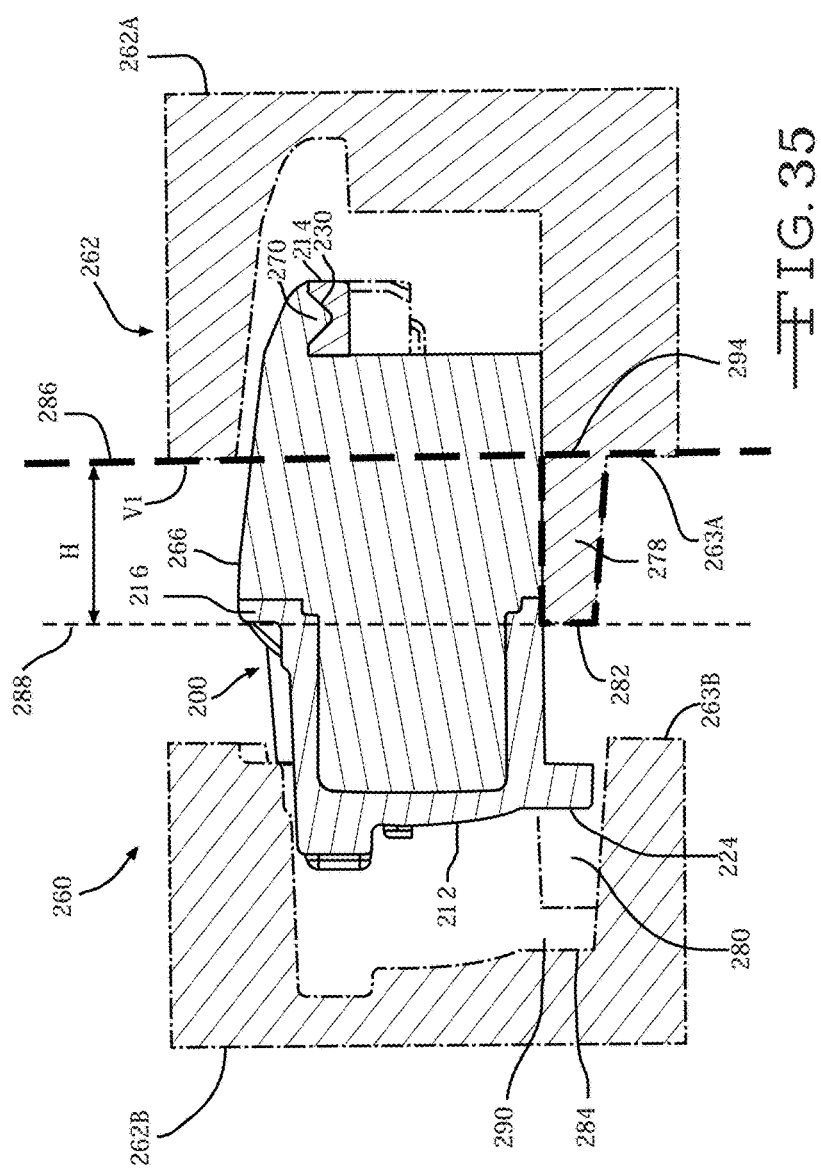
FIG. 35 is a partially exploded sectional view taken along line 35-35 of FIG. 29.

Also, as best shown in FIGS. 34 and 35 (FIG. 35 is similar to FIG. 34 but shows FIG. 34 with the mold sections 262A and 262B separated for clarity), the mold 262 includes a third male outward extension or protuberance 278. The third extension 278 extends outwardly from the mold section 262A and enters a corresponding receptacle 280 in the mold section 262B, which results in the jogged vertical split line V1 for the mold 262. The receptacle 280 may be a groove in the mold section 262B. Alternatively, the shape, construction, type, or configuration of the third extension 278 and receptacle 280 can be other than illustrated and described if so desired. In the illustrated embodiment, preferably at least a tip or remote end 282 of the third extension 278 does not directly contact an interior back surface 284 of the mold section 262B thereby leaving a space 290 (illustrated as being occupied by the third lug 224 of the brake caliper 200), between the tip 282 and the back surface 284. As a result, the third extension 278 is effective to produce the third lug 224 by casting material filling the space 290 during step 250. The jogged vertical split line V1 of the mold 262 produces the third lug 224 by the third extension 278 extending outwardly from the mold section 262A and entering the receptacle 280 in the mold section 262B.

In the illustrated embodiment, there is also provided a gap or annular space 292 (illustrated as being occupied by the bore 240 of the brake caliper 200) between the third extension 278 and the core member 266. The gap 292 is for formation of the bore 240. As one skilled in the art will readily understand, the extension 278 and the receptacle 280 are not limited to producing the third lug 224 and may be used to produce any external surface feature for the brake caliper 200 wherein the external surface feature does not extend to the jogged vertical split line V1.

The mold section 262A has an end face or surface 263A and the mold section 262B has an end face or surface 263B. Either or both of the end faces 263A and 263B may have minor undulations. Alternatively, either or both of the end faces 263A and 263B may be planar. When the mold sections 262A and 262B are assembled into the mold 262, the end face 263A of the mold section 262A meets the end face 263B of the mold section 262B at the interface. The interface between the mold sections 262A and 262B defines a first vertical zone 286 and the tip 282 of the mold section 262A defines a second vertical zone 288, the first vertical zone 286 being the horizontal distance H from the second vertical zone 288. In the illustrated embodiment, the jogged vertical split line V1 includes both the first vertical zone 286 and the second vertical zone 288. As such, the third extension 278 creates the jogged vertical split line V1 by extending the horizontal distance H from the first vertical zone 286 to the second vertical zone 288. As shown, the first vertical zone 286 and the second vertical zone 288 may be substantially parallel. Alternatively, orientation of the first vertical zone 286 and the second vertical zone 288 may be as required for a specific application of the brake caliper 200.

Typically, a base 294 of the third extension 278 will have a greater cross sectional area than the tip 282 such that the third extension is tapered from the tip 282 to the base. Tapering the third extension 278 may improve insertion of the third extension 278 into the receptacle 280 when the mold 262 is assembled. Alternatively, the tip 282 and base 294 may both have the same cross sectional area. The base 294 may have a lesser cross sectional area than an area of the end face 263A such that the base 294 does not span an entirety of the end face 263A. Alternatively, the base 294 may have an equal cross sectional area to the area of the end face 263A such that the base 294 does span the entirety of the end face 263A. The tip 282 has a lesser cross sectional area than the area of the end face 263A. Similarly, the receptacle 280 has a lesser cross sectional area than an area of the end face 263B.

Next, the brake caliper 200 is removed from the casting apparatus 260 during step 252. As discussed above, the brake caliper 200 includes the conical recess 230, the channel surface 234, and the flat surfaces 232, 246, and 248. As will be discussed below, the recess 230, the generally flat surface 232, and the channel surface 234 define locating or datum surfaces and the surfaces 246 and 248 define clamping surfaces for subsequent processing of the brake caliper 200.

Figure 25:
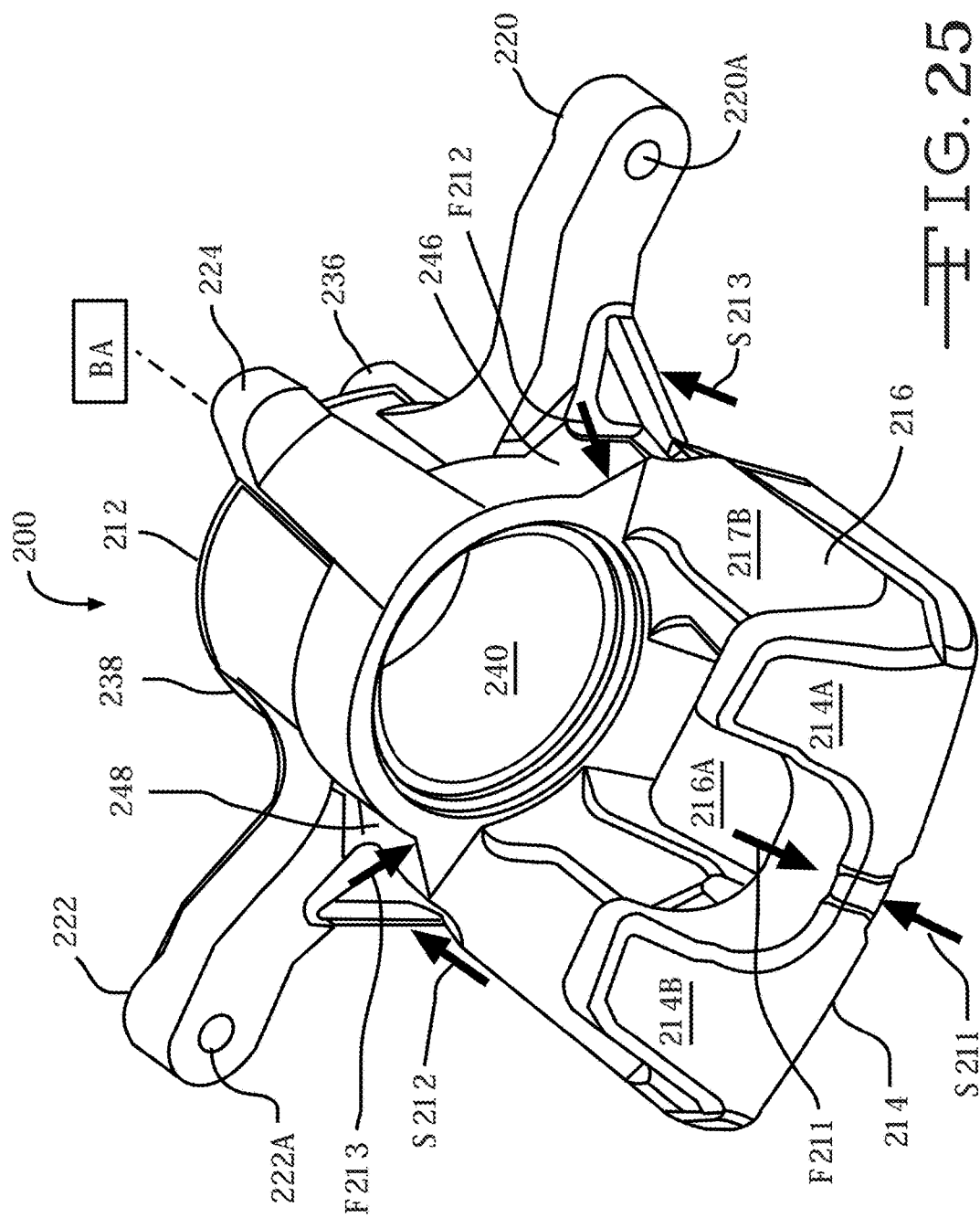
FIG. 25 is another perspective view of the brake caliper of the present invention.

Following this, selected surfaces of the brake caliper 200 are machined to predetermined tolerances using a known machining apparatus (not shown) during step 254. To accomplish this, the conical recess 230, the generally flat surface 232, and the channel surface 234 are used as datum or locating surfaces. In particular, the caliper 200 is positioned in an "upside down" position (i.e., bridge side facing down), as shown in FIG. 25, and supported in this position by a suitable first locating/supporting member (designated by arrow S211 in FIG. 25), which is disposed in the conical recess 230, and a pair of second locating/supporting members (designated by arrows S212 and S213 in FIG. 25), which engage the channel and generally flat surfaces 234 and 232, respectively, to define a first horizontal plane Y1 (FIG. 27) of the brake caliper 200. As shown therein, the first horizontal plane Y1 passes through a center point 259 of the first member S211 and is offset a predetermined distance E210 from the recessed surface 234 and a predetermined distance E211 from the generally flat surface 232. Alternatively, the first horizontal plane Y1 may also be offset a predetermined distance from the recess 230. A suitable first member S211 may be a predetermined sized ball 258 shown in phantom in FIG. 27. A suitable pair of second members S212 and S213 may be a pair of pins with flat heads (not shown).

Next, while in this position, a first clamp member (not shown), which is operative to clamp and apply a first force F211 (shown in FIG. 25) to a selected surface of the outboard leg portion 214 of the caliper 200 generally opposite the ball 258 in the recess 230, and a pair of second clamp members (not shown), which are operative to clamp and apply a pair of second forces F212 and F213 (shown in FIG. 25) to the angled clamping surfaces 246 and 248 of the caliper, respectively, are used to define a second vertical plane X1 and a third vertical plane Z1 of the caliper 200. Alternatively, other suitable methods and/or members can be used to hold and/or clamp the brake caliper 200 to enable the recess 230 and surfaces 232, 234, 246, and 248 to be used as locating surfaces to determine the planes X1, Y1, and Z1 if so desired.

The second vertical plane X1 and the third vertical plane Z1 pass through the center point 259 of the first member S211. Alternatively, the second vertical plane X1 and the third vertical plane Z1 may be offset predetermined distances from the brake caliper 200. In the illustrated embodiment, the second vertical plane X1 and the third vertical plane Z1 bisect one another in a generally perpendicular manner and the first horizontal plane Y1 and the second vertical plane X1 bisect one another in a generally perpendicular manner. Alternatively, the orientation of one or more of the three planes X1, Y1, and Z1 can be other than illustrated if so desired.

In the illustrated embodiment, once the above described three planes X1, Y1, and Z1 of the brake caliper 200 have been established and with the forces F211, F212, and F213 applied, selected surfaces of the brake caliper 200 are machined to predetermined tolerances. In the illustrated embodiment, the selected surfaces include the machining of ears 220 and 222 and the finish machining of the piston bore 240. In particular, as shown in FIG. 26, an outer surface 222B of the ear 222 is machined a predetermined distance A210 relative to the Z1 axis so as to define a flat outer surface which is in parallel relationship with the Z1 axis. Similarly, an outer surface 220B of the ear 220 is machined a predetermined distance A211 relative to the Z1 axis so as to define a flat outer surface which is in parallel relationship with the Z axis. In the illustrated embodiment, the distances A210 and A211 are the same.

Figure 27:
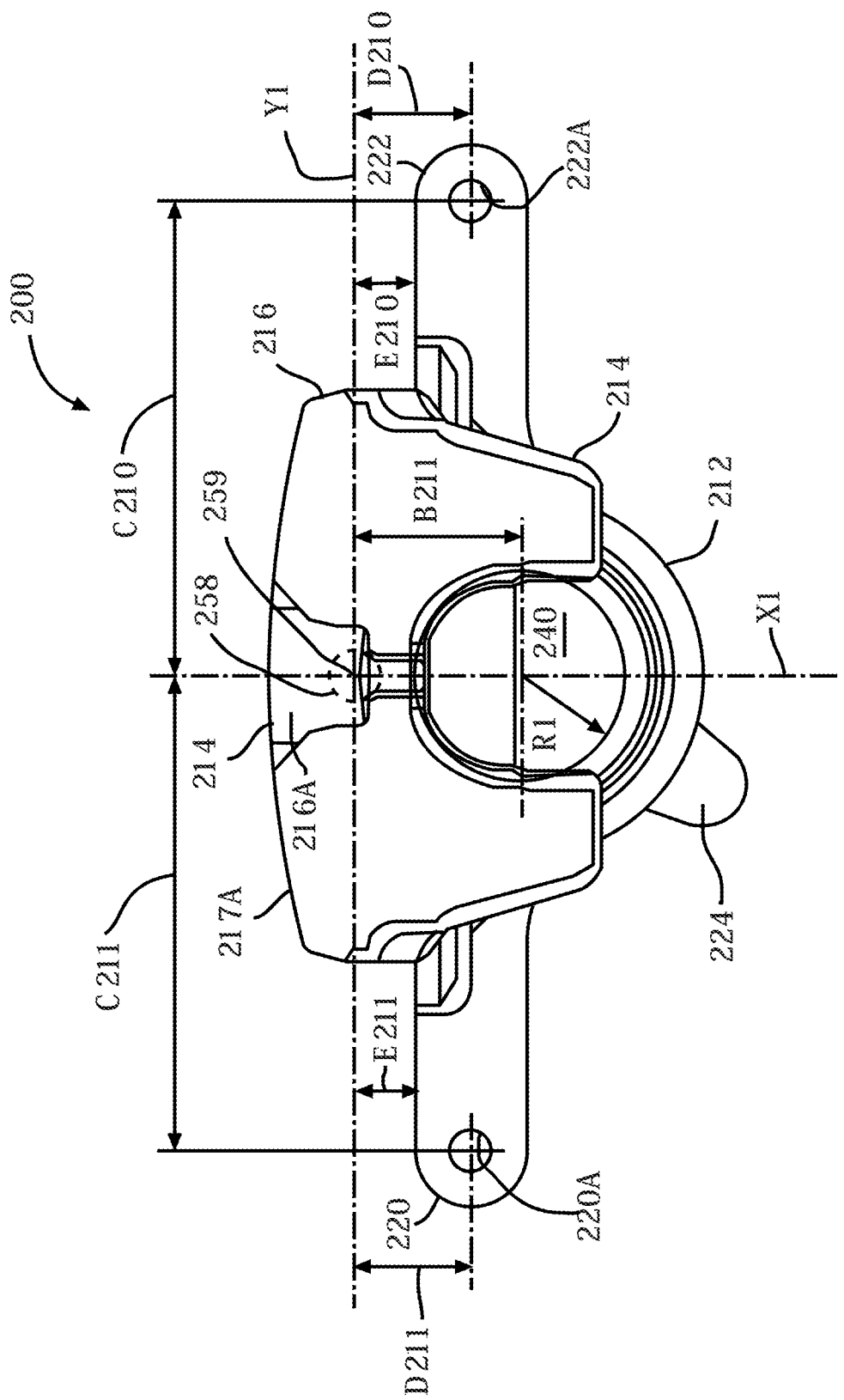
FIG. 27 is an inboard facing side view of the brake caliper of the present invention.

Also, as shown in FIG. 27, the opening 222A is machined a predetermined distance C210 with respect to the X1 axis and a predetermined distance D210 with respect to the Y1 axis. Similarly, the opening 220A is machined a predetermined distance C211 with respect to the second vertical X1 axis and a predetermined distance D211 with respect to the first horizontal Y1 axis. In the illustrated embodiment, the distances C210 and C211 are the same and the distances D210 and D211 are the same. In addition, as shown in FIG. 27, the piston bore 240 is machined centered with respect to the second vertical X1 axis and is a predetermined distance B211 from the first horizontal Y1 axis so as to define piston bore radii R1. Following this, in step 256, other selected surfaces of the brake caliper 200 are machined to predetermined tolerances to produce the finish machined brake caliper 200. To accomplish this, one or more of the surfaces 220B and 222B, the apertures 220A and 222A, and the piston bores 240 are used as datum points to carry out the finish machining of the brake caliper 200 during step 256.

One advantage of the embodiment of the brake caliper 200 is the formation of the third lug 224 using the mold 262 having the jogged vertical split line V1. This is due to the fact that the third extension 278 extends from the mold section 262A and extends into the receptacle 280 of the mold section 262B. As a result of this, the third lug 224 may be formed on the brake caliper 200 using the mold 262 having the jogged vertical split line V1 without excess material being included in the brake caliper 200. The excess material would fill between the third lug 224 and the first vertical zone 286. In the prior art brake caliper 100, where the vertical split line for the mold 162 is a single zone between the mold sections 162A and 162B, excess material would extend from the vertical split line to a third lug on the bores 140. Furthermore, in the prior art brake caliper 100, the core 166 is not suitable to form a third lug because the third lug is external to the bores 140 while the core 166 is internal to the bores 140.

Figure 36:
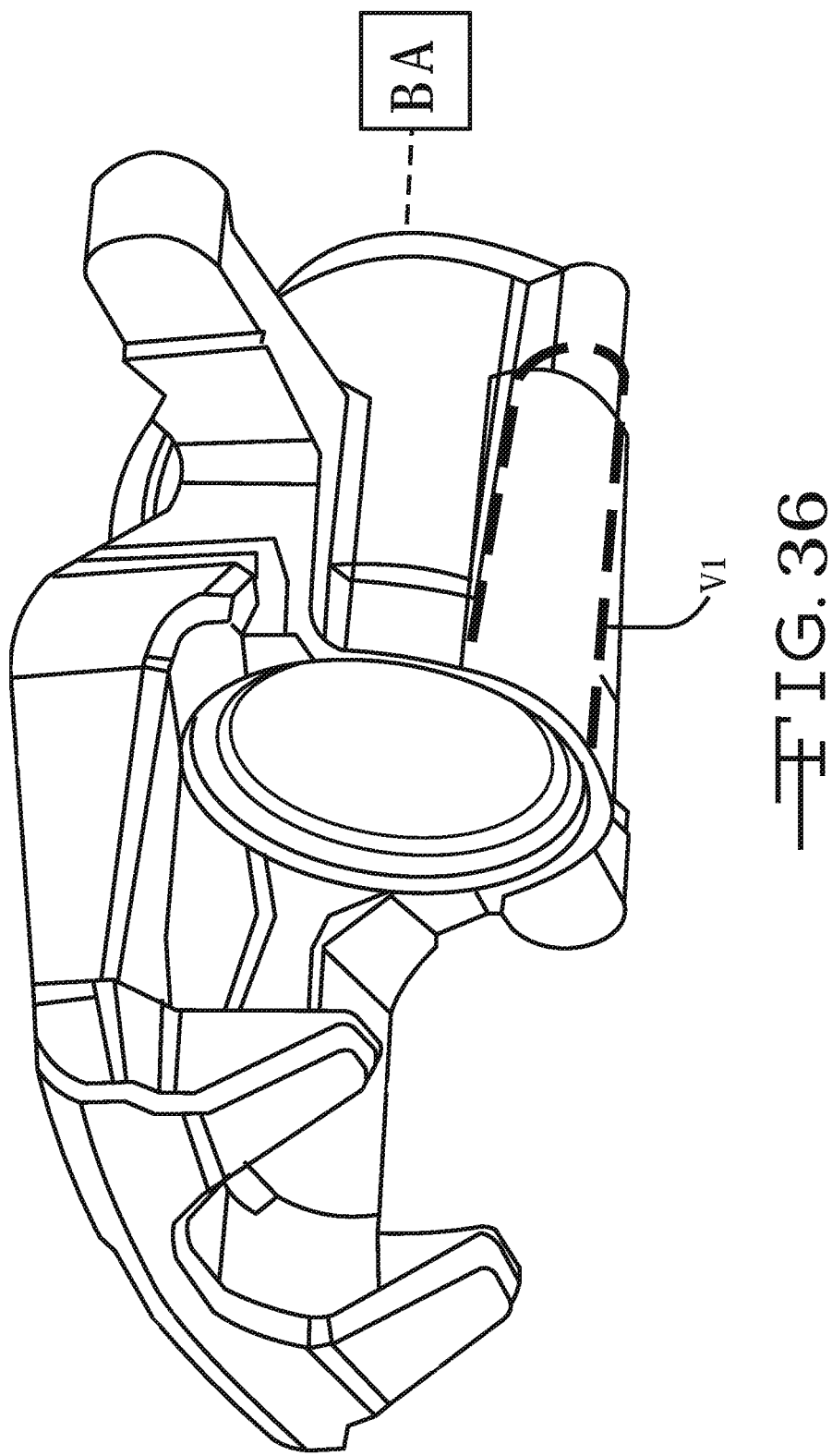
FIG. 36 is a perspective view of a second embodiment of a brake caliper produced in accordance with the present invention.
Figure 37:
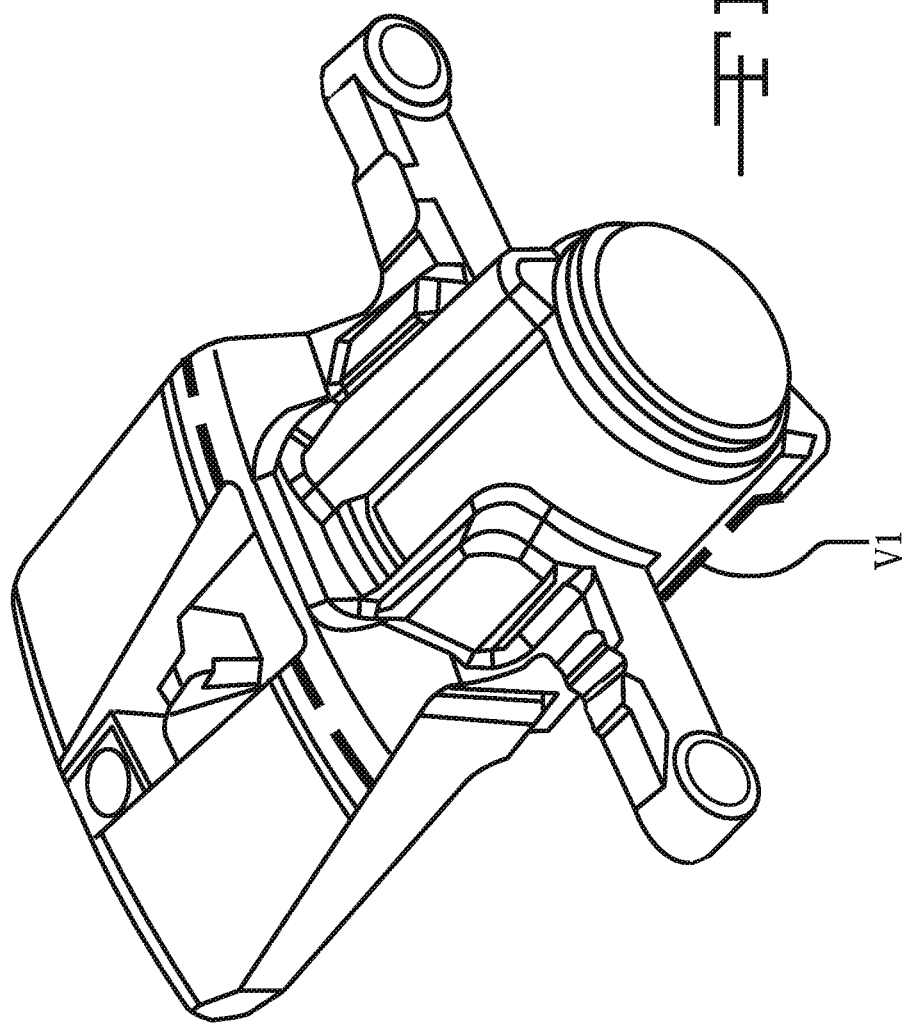
FIG. 37 is another perspective view of the second embodiment of the brake caliper produced in accordance with the present invention.

Turning now to FIGS. 36 and 37, there is illustrated a second embodiment of a brake caliper, indicated generally at 300, produced in accordance with the present invention. Because the brake caliper 300 is a variation of the brake caliper 200 of FIGS. 24-35, like reference numerals, increased by 100, designate corresponding parts in the drawings and detailed description thereof will be omitted. A jogged vertical split line V1 used in producing the brake caliper 300 is projected onto the brake caliper 300. The jogged vertical split line V1 produces a third lug 324 for the brake caliper 300.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A method of producing a brake caliper adapted for use in a disc brake assembly comprising:
   (a) providing a mold member having first and second mold sections meeting at a vertical interface, the first mold section having an extension from the vertical interface into the second mold section for a horizontal distance to form an integrally cast lug on a cast brake caliper, wherein the vertical interface is in a first vertical zone and a tip of the first mold extension is in a second vertical zone at the horizontal distance from the first vertical zone, the first and second vertical zones comprising a jogged vertical split line between the first and second mold sections;
   (b) providing a core member having three extensions operative to form three integrally cast locating surfaces on the cast brake caliper, the extensions defining datum surfaces for subsequent machining of the cast brake caliper to predetermined tolerances using the three locating surfaces as the datum surfaces;

(c) disposing the core member in the mold member;

(d) supplying a suitable casting material to the mold member so as to form the brake caliper within the mold;

(e) removing the cast brake caliper from the mold member, wherein the brake caliper includes the three integrally cast locating surfaces formed therein by the three extensions of the core member and the integrally cast lug formed by the extension; and (f) machining the cast brake caliper using the three integrally cast locating surfaces formed on the brake caliper as the datum surfaces to thereby produce the brake caliper.

2. The method of claim 1 wherein the cast brake caliper includes one piston bore formed therein and the cast brake caliper is a single piston brake caliper.

3. The method of claim 1 wherein two of the core member extensions are male extensions adapted to form two of the integrally cast surfaces on an associated pair of ears of the cast brake caliper, the two surfaces on the pair of ears being used as locating surfaces for subsequent machining of the brake caliper.

4. The method of claim 1 wherein two of the core member extensions are adapted to form two of the locating surfaces on an inboard leg portion of the cast brake caliper and one of the core member extensions is adapted to form one of the locating surfaces on an outboard leg portion of the cast brake caliper.

5. The method of claim 1 further comprising a receptacle in the second mold section extending inward from the vertical interface to an interior back surface, wherein the extension enters the receptacle without contacting the interior back surface to form the integrally cast lug.

6. The method of claim 1 further comprising a gap between the extension and the core member.

7. The method of claim 6 wherein the gap is operative to form a piston bore.

\* \* \* \* \*